Figure 1:
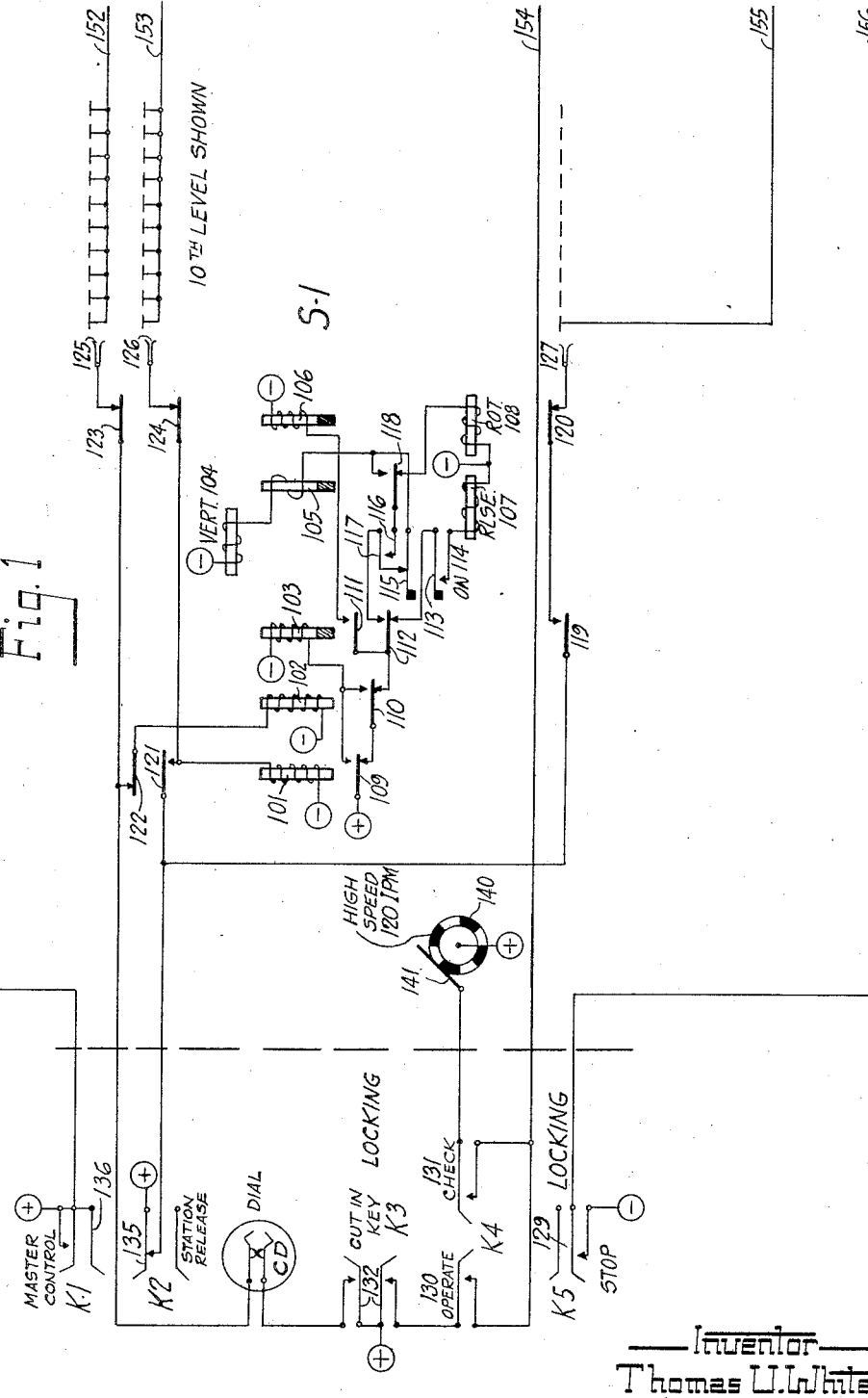

Dec. 17, 1935. T. U. WHITE 2,024,712
DISPATCHER'S ELECTRIC DISPLAY BOARD FOR SYSTEMS OF POWER DISTRIBUTION
Original Filed May 31, 1930 8 Sheets-Sheet 2

Inventor—
Thomas U. White
Wm Walter Owen. Atty

Dec. 17, 1935. T. U. WHITE 2,024,712
DISPATCHER'S ELECTRIC DISPLAY BOARD FOR SYSTEMS OF POWER DISTRIBUTION
Original Filed May 31, 1930 8 Sheets-Sheet 3

Dec. 17, 1935.　　　T. U. WHITE　　　2,024,712
DISPATCHER'S ELECTRIC DISPLAY BOARD FOR SYSTEMS OF POWER DISTRIBUTION
Original Filed May 31, 1930　　8 Sheets-Sheet 6
Fig. 6
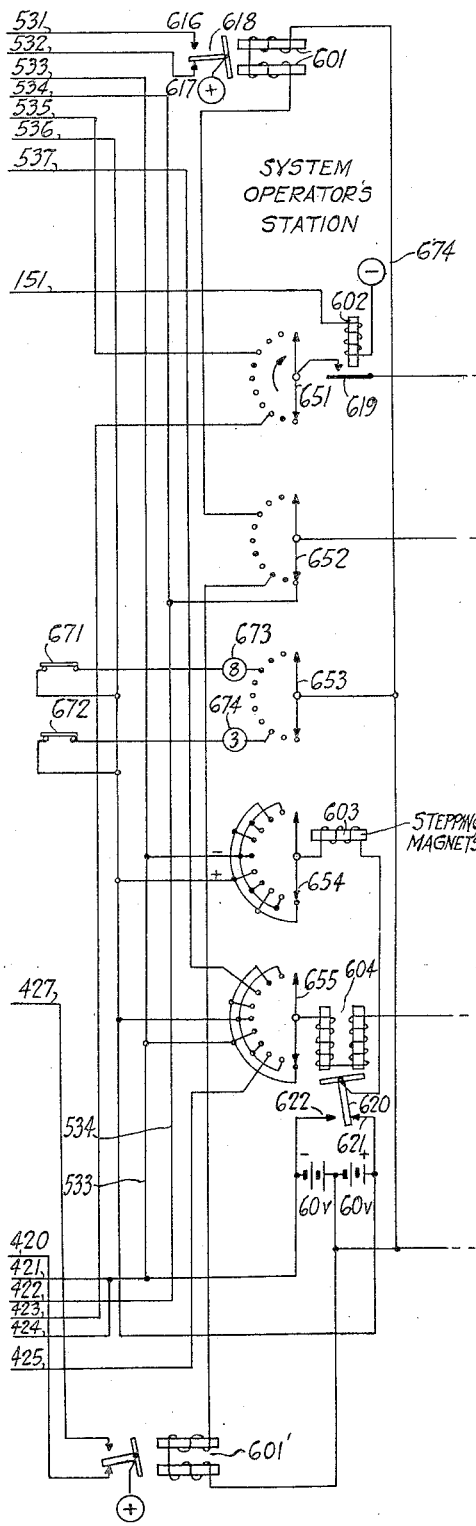
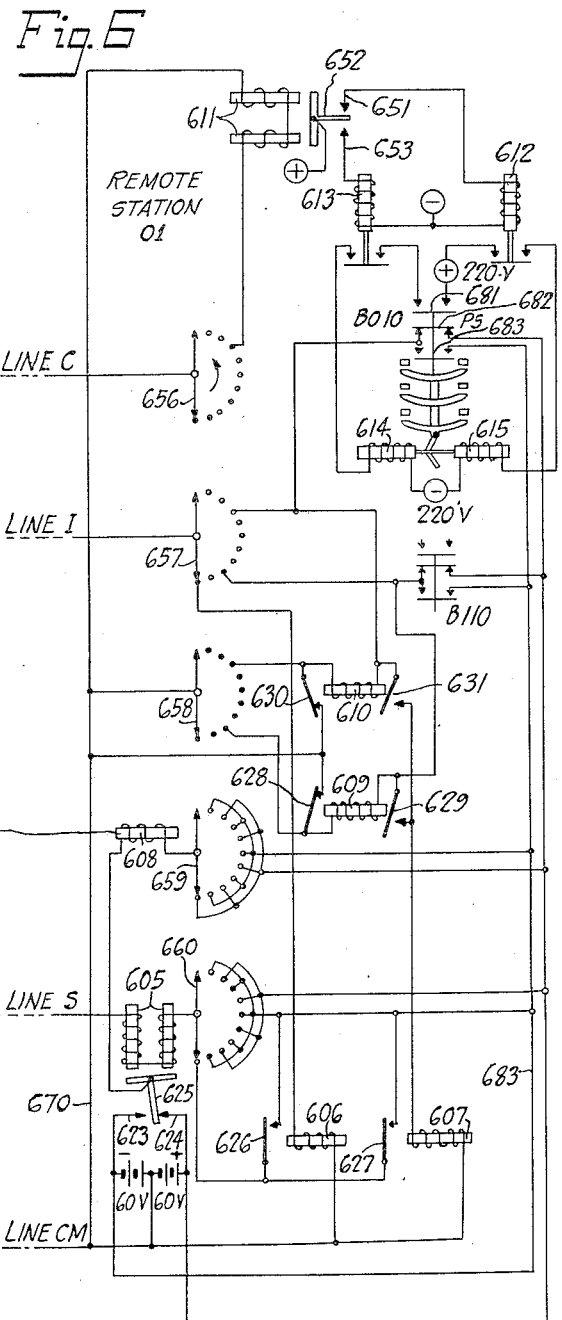
Inventor
Thomas U. White
Wm. Walter Owen Atty.

Dec. 17, 1935.  T. U. WHITE  2,024,712
DISPATCHER'S ELECTRIC DISPLAY BOARD FOR SYSTEMS OF POWER DISTRIBUTION
Original Filed May 31, 1930   8 Sheets—Sheet 7

Inventor
Thomas U. White
Wm Watson Owen Atty.

Dec. 17, 1935. T. U. WHITE 2,024,712
DISPATCHER'S ELECTRIC DISPLAY BOARD FOR SYSTEMS OF POWER DISTRIBUTION
Original Filed May 31, 1930  8 Sheets-Sheet 8
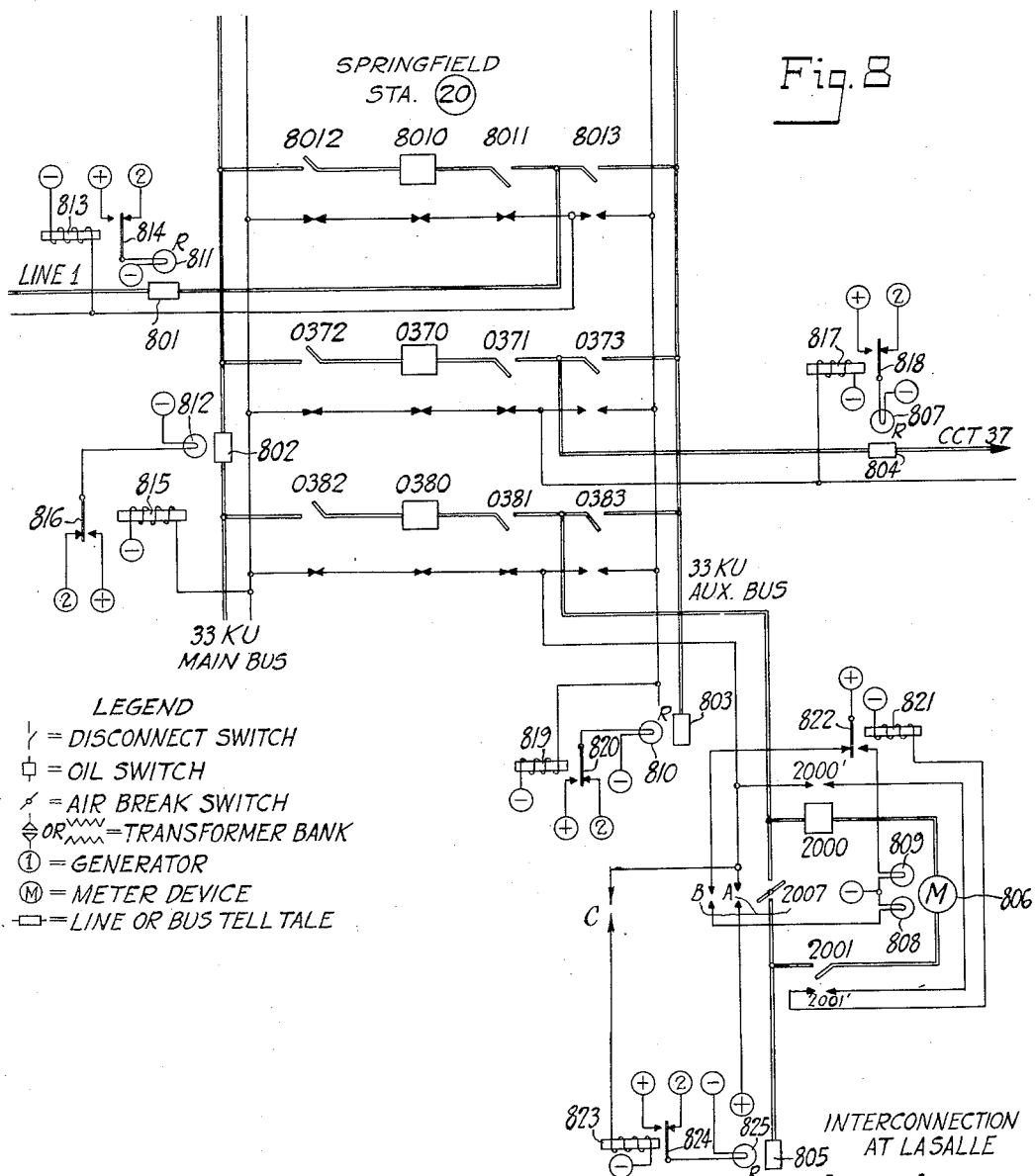

Patented Dec. 17, 1935

2,024,712

UNITED STATES PATENT OFFICE 2,024,712

DISPATCHER'S ELECTRIC DISPLAY BOARD FOR SYSTEMS OF POWER DISTRIBUTION

Thomas U. White, Oak Park, Ill., assignor, by mesne assignments, to Associated Electric Laboratories Inc., Chicago, Ill., a corporation of Delaware Application May 31, 1930, Serial No. 457,858
Renewed May 8, 1935

18 Claims. (Cl. 177—311)

My invention relates in general to centralized control board systems, and more particularly to that class now quite generally known as system operator's control board system.

Operating conditions with utilities engaged in the transmission and distribution of electrical energy to our various communities, requires that at certain points in the system a centralized load dispatching or power-directing office be established. This power-directing office is usually called the system operating department or load dispatching department and the operators are called system operators or load dispatchers.

It is the duty of the system operator to coordinate all the utility departments to bring about the highest continuity of service with greatest economy of operation and the highest degree of human safety.

The system operator's activities commence at the generating station boilers, embrace the generating units with their auxiliaries, traverse the transmission lines, include the substation and its apparatus, and end out on the distribution circuits. He is responsibe at every moment for the generation, transmission, and distribution of the proper amount of power load. He computes the demand to be met, schedules it on his generating units and interconnections with other systems, ascertains that at each station connections will provide sufficient electrical capacity to carry the load, and that there will be sufficient reserve energy to compensate for the loss of the largest source of supply available. He must keep in mind the condition of plant equipment and their ability to carry loads.

His general supervision over work in progress is essential to continuity of service and human safety, as he authorizes the operation of all switching equipment necessary to permit work on lines or physical equipment, and establishes all "blocking" or "hold" conditions on the equipment to prevent its movement without his authorization or clearance order.

In order that the system operator may have every facility for the quick analysis of operating conditions, many operating companies are now installing system operator's control boards. On these boards the power system is represented symbolically by a one-line diagram of the connection of the equipment and circuits comprising the system of power transmission and distribution. The symbols and legends used in the construction of such boards have become somewhat standard. Many of these boards are designed to provide a live map of the entire transmission network, with indicating systems of varying degrees of complexity, some manually operated and some automatically operated, to keep this map or control board altered to show the latest condition of the power system.

In the operation of increasingly complex transmission networks, it is necessary that accurate information regarding the position of oil circuit breakers and the magnitude of the load being handled be available for the system operators. Communication of this information from point to point on a large system constitutes a considerable problem in itself, as indicated by the fact that large operating companies are building separate organizations whose sole duties are to provide for the correct transmission of intelligence of all sorts.

In many cases the information for posting the system operator's control board is brought by telephone and all or part of this telephone channel may consist of certain leased telephone line circuits, communication circuits which are the property of the operating company, or may be some sort of power line communication equipment.

In line with the general tendency toward economy in the use of operating labor, operating companies are installing various types of unattended substations and generating stations, and most of these have some form of remote control. Selective supervisory control systems have been installed for transmitting information from the unattended station to the system operator's office and for enabling the system operator to control the various circuits in the remote station.

Increasingly complex switching circuits together with the increase in size of the system operator's domain and his added responsibilities, have brought the demand for automatic means for indicating to the system operator the effect of each operation of switching equipment which occurs in the system. It is not sufficient that means be provided to indicate on his control board the position of each switching element in the system, but it is becoming necessary that he be provided automatically with an indication indicative of the effect of each such operation to the system as a whole.

One object of this invention is to provide means automatically operative to assist the system operator in analyzing the results of operations of switching equipment as they occur on his system.

Another object of the invention is to provide an improved means of indicating through the medium of supervisory control or remote supervisory equipment, the position of remotely located switching mechanism on the system operator's control board, and to provide a means entirely automatically operated to indicate not only the position of switch mechanisms, but the result to the power system due to changes in the position of such switch mechanisms.

Another object of the invention is to provide an improved means of interlocking circuits on a system operator's control board in such a manner as to prevent the operation of remotely controlled switching mechanism under certain "blocking" or predetermined "hold" conditions.

Still another object of the invention is to provide an improved low voltage mimic power circuit automatically operative to indicate by a scheme of tell-tale signals, the condition of a power system as represented by an electrified one-line diagram.

Another object of the invention is to provide an improved means of controlling and supervising the position of remotely located power-switching mechanisms.

There are other objects of the invention which will be brought out in the detailed explanation which follows:

In practicing my invention I employ a system operator's control board of the electric lamp-signal type, an improved means of selectively controlling the condition of the electric signals on the face equipment of the dispatcher's control board, and a simple form of supervisory control equipment.

Figure 2:
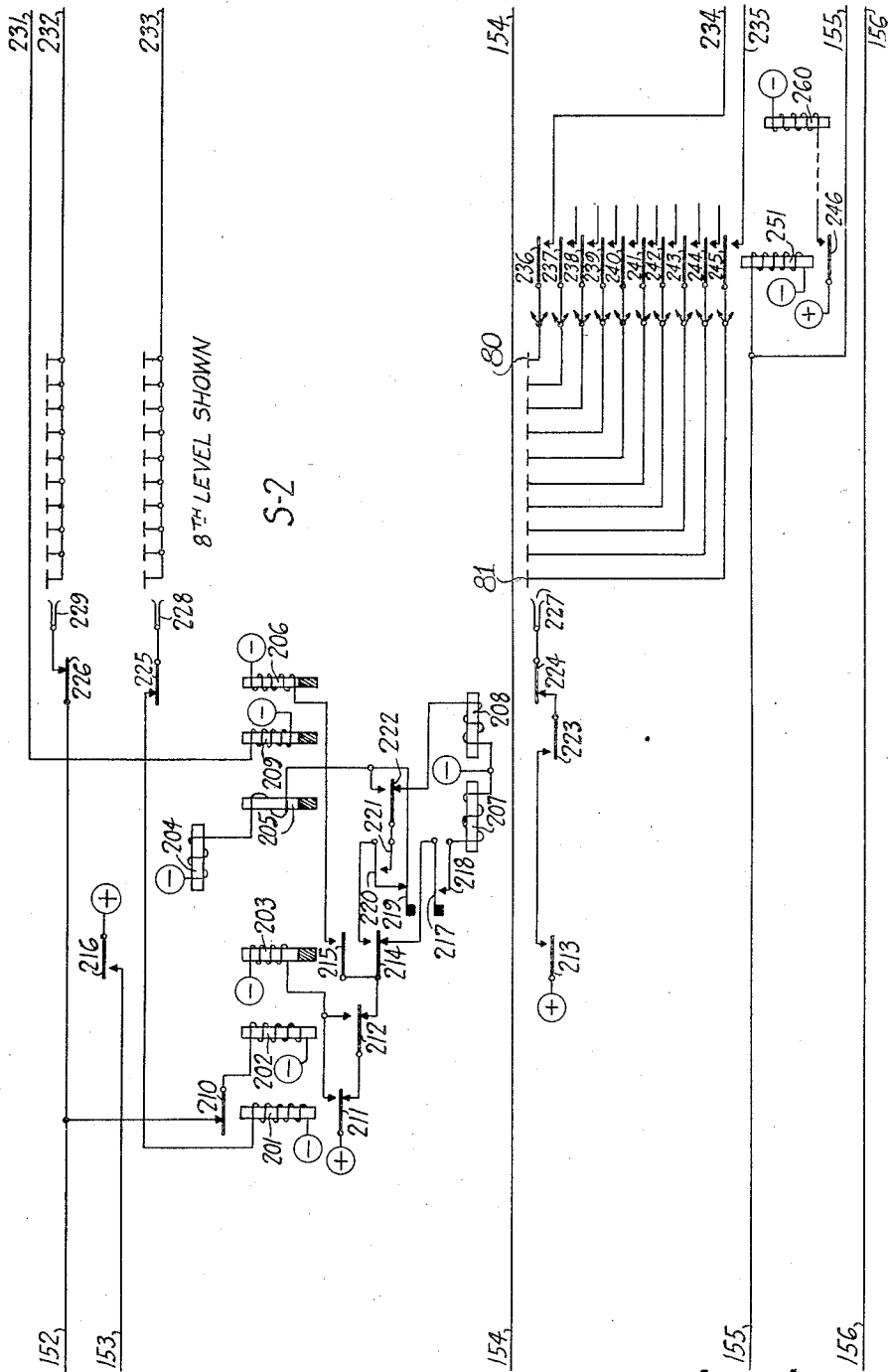
Figure 3:
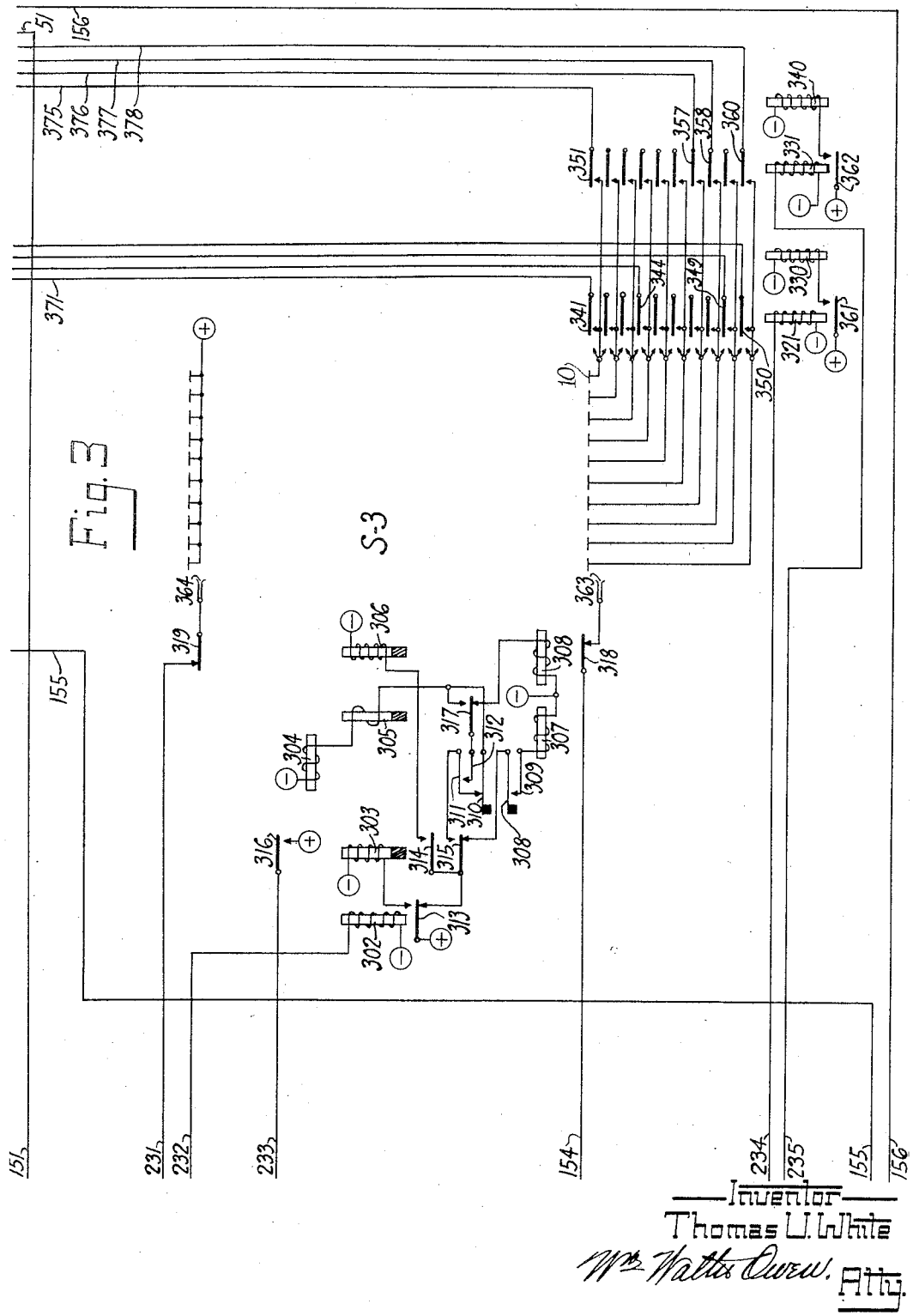

In drawings, Figs. 1 to 3, inclusive, illustrate the circuits and equipment used in selecting and controlling cam operating mechanisms of the step-by-step notching type which are wired to energize or deenergize lamp signals on the system operator's control board and to control circuits of the supervisory equipment. These notching relays and the circuits by means of which they control the lamp signals on the system operator's control board are shown diagrammatically in Figs. 4 and 5.

Fig. 6 of the drawings illustrates the circuits and apparatus of one type of supervisory control equipment which may be used in conjunction with the system operator's control board for controlling and supervising the operation of remotely located switching mechanism from a system operator's office.

Figure 7:
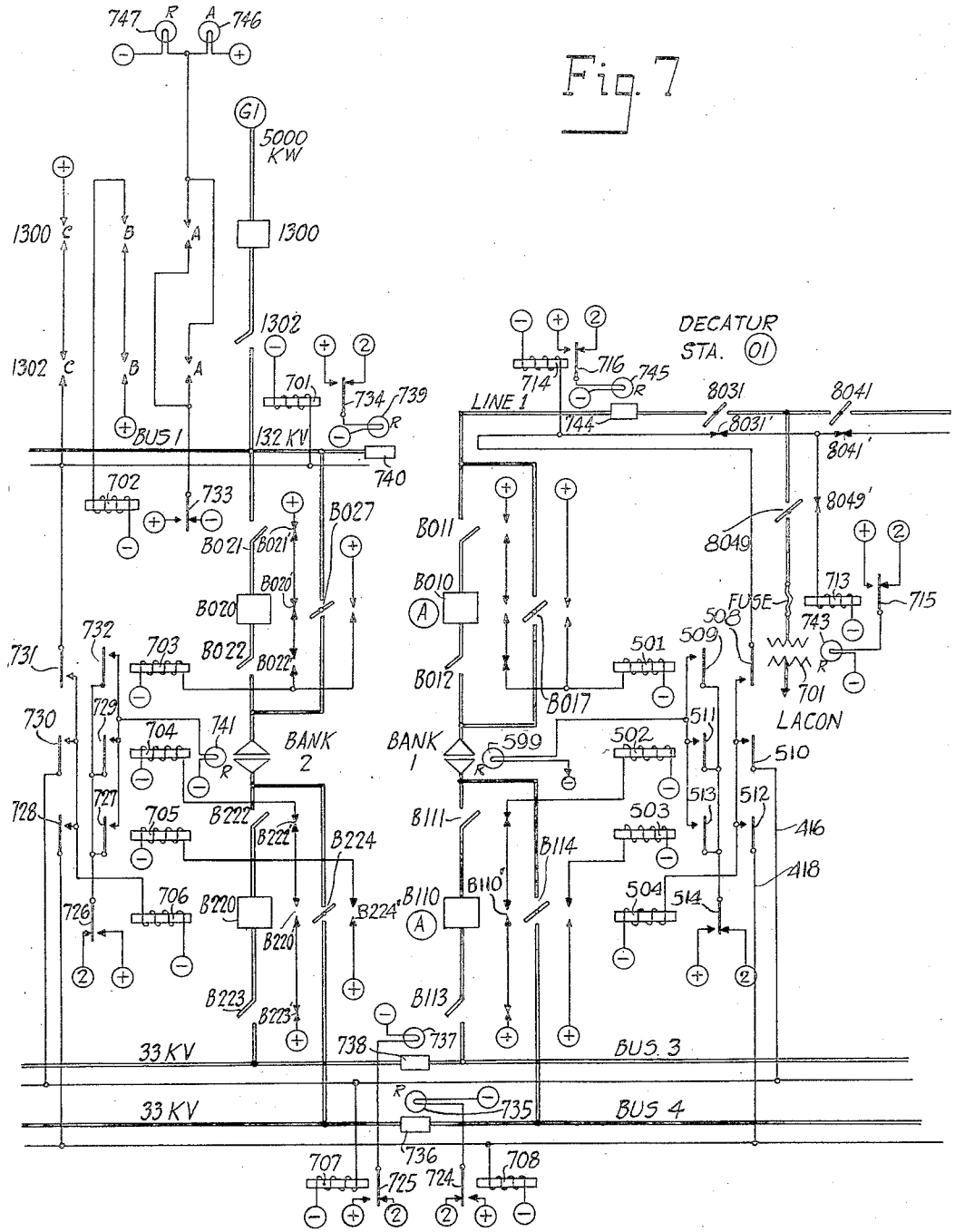

Figs. 7 and 8 of the drawings illustrate diagrammatically tell-tale equipment which is automatically operative to indicate to the system operator the changed condition of the power system as various position indications are displayed by the signals representing the switching mechanisms.

Figure 4:
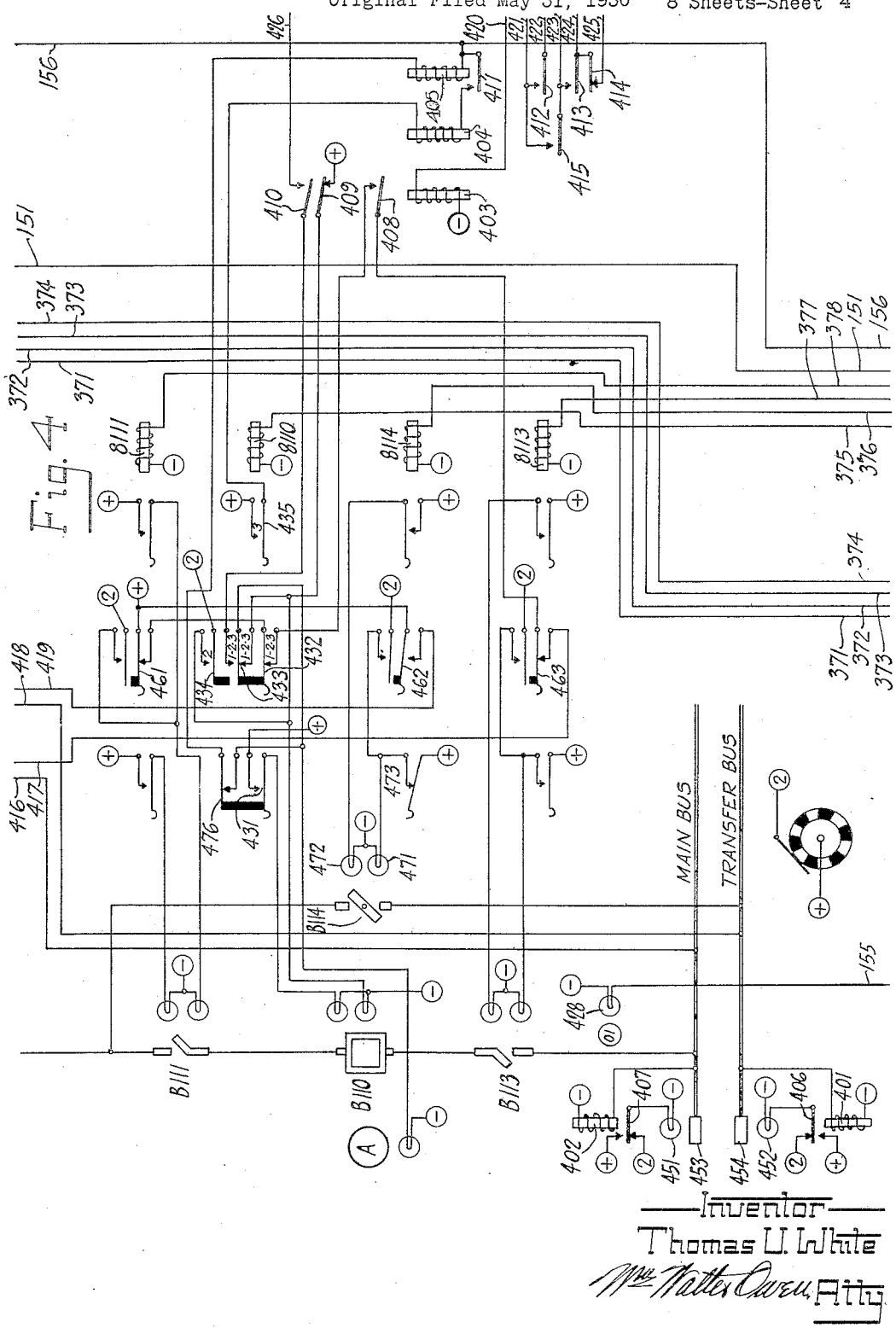
Figure 5:
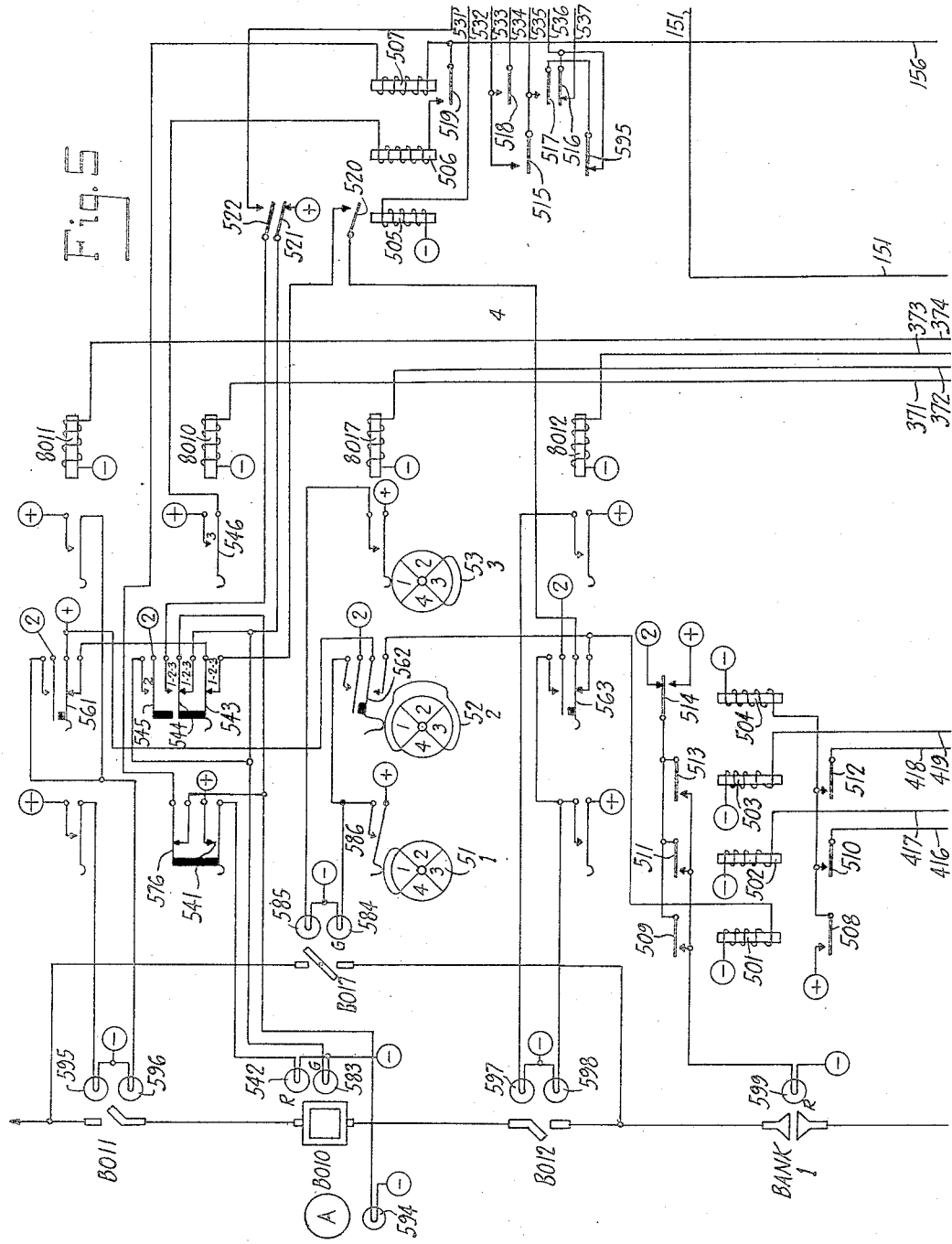

The one-line diagram as shown in Figs 7 and 8 and a portion of which is shown in Figs. 4 and 5, is of the type which employs lampsignal equipment consisting of lamp sockets having two or more colored lamps arranged to be mounted therein, preferably provided with molded glass lenses in the form of standard symbols for oil switches, disconnect switches, air-break switches, motor-operated disconnects, transformers, generators, etc. When one of the colored lamps is energized, the raised portion of its glass lens is illuminated to indicate the position or condition of the apparatus it represents.

The entire face equipment on which the one-line diagram is displayed may consist of an assembly of these lamp signal units and plain or embossed blank escutcheons mounted on supports in the manner described in the co-pending White application, Serial No. 425,121, filed February 1, 1930, which permits changing the face equipment about in a checker-board fashion to care for changes and additions to the power system as represented by the one-line diagram.

As will be brought out later the system operator's control board indicates automatically the effect, to the entire system, as represented on the one-line diagram, of each operation of a switching unit, in addition to recording the changed position of each switch unit. In illustrating the invention only a small portion of the one-line diagram of the system operator's control board is illustrated in Figs. 4 to 8, inclusive. Legends shown on Fig. 8 identify the type or function of the switches and signals represented by the symbols of the one-line diagram.

The signalling indications used on a system operator's control board of this type depend to some extent on the type of power system to which it is applied. However, in practicing this invention, the following signalling indications are those generally acceptable on a system operator's control board employing a one-line diagram of the type shown in the drawings.

(1) When a generator symbol is illuminated a steady red, the generator energy is connected to the power system. (2) When the generator symbol is illuminated an amber color this indicates to the dispatcher that the generator's energy is available but not in use. (3) When the generator's symbol is dark, that is, not illuminated, the generator is indicated as "shut-down".

(4) When a switch symbol is illuminated a green color, this indicates that the switch is "open". (5) When the switch symbol is illuminated a red color, this indicates that the switch is "blocked" as for "hold" conditions. (6) When the switch symbol is dark, that is, not illuminated, the indication is that the switch is "closed".

(7) A white or clear lamp signal and with a green or dark symbol indicates an alarm or disagreement condition.

(8) When a transformer bank symbol is illuminated a steady red color, this indicates that the transformer is live or energized. (9) When the transformer bank symbol is illuminated by a flashing red signal, this indicates that the transformer is connected to the system but is not energized. (10) When the transformer bank symbol is dark, that is, not illuminated, this indicates that the transformer bank has been taken out of service.

(11) When a meter symbol is illuminated by an amber color, this indicates that the power system is supplying energy to the connected system. (12) When the meter symbol is illuminated a red color, this indicates that the system is obtaining power from the interconnection.

(13) When a line or bus tell-tale is illuminated a steady red color, this indicates that the line or bus is energized. (14) When a line or bus tell-tale is illuminated by a flashing red signal, this indicates that the line or bus is dead or deenergized at the location of the tell-tale symbol.

The above tell-tale signals and position indications will be fully described in the description which follows:

Referring now more particularly to the drawings in Fig. 1, the keys K1 to K5, inclusive, and the calling device CD are the only devices located at the system operator's position. The remaining equipment and circuits illustrated in Figs. 2 to 5, inclusive, and a part of that shown in Fig. 6, may be located on the system operator's control board, which is, of course, located in the same room with the system operator, but is usually at some distance from his operating desk and is arranged in a straight line or in a semi-circle, depending on the size of the board.

That portion of the equipment shown in the right portion of Fig. 6 is at a remote station, and is connected to the system operator's station by means of the line conductors C, I, S, and CM. The equipment illustrated in Fig. 6 is one type of supervisory control equipment which may be employed to advantage with a system operator's control board of the type covered by my invention. Any system of transmitting intelligence which provides a means of controlling from an operator's office, the operation of switching devices, such as oil-circuit breakers located at a remote station, and which provides a visual indication at the operator's office to indicate the position of such remotely disposed apparatus, may, however, be used in practicing the invention.

The drawings, Figs. 7 and 8, illustrate diagrammatically the circuits and apparatus used to provide tell-tale indications on a one-line diagram, and the general arrangement of the symbols and circuits of a portion of a one-line diagram illustrating a system of power distribution. The heavy lines as shown in Figs. 7 and 8 indicate the one-line diagram and the symbols used to designate the various switching elements. The light lines illustrate the circuits and equipment used in electrifying this one-line diagram to provide the tell-tale indications. The lamp signals used to indicate the positions of the various switching elements are not shown associated with the symbols in Figs. 7 and 8, however, these details being illustrated in Figs. 4 and 5.

By means of the keys K1 to K5, inclusive, and the dial CD, the system operator may cause the operation of the selective equipment to pick out a particular switch symbol, on the control board, which corresponds to the physical equipment that he desires to control or to supervise. By means of contacts 131 of key K4 he may check the accuracy of his selecting devices, after which he may operate the notching relay device by actuating contacts 130 of key K4 to control the circuits of the lamp signals in a manner to set up the desired indication on the selected switch symbol. In this manner he may check the accuracy of his switching instructions or control operations before the actual performance of the operation takes place. As the switch symbols on the one-line diagram of the control board are energized to display the various signal indications, certain other circuits illustrated in Figs. 7 and 8 are operated automatically to provide tell-tale indications on the one-line diagram, to indicate to the system operator when transformers, lines, and busses have been made live or dead, due to switching operations.

When the system operator has determined that his plans are correct, means are provided to maintain the connection to the switch symbol located on the system operator's control board in such a manner that when the master control key K1 is operated, the supervisory control equipment will be actuated to transmit impulses to remotely located power switching equipment which will result in the operation of such equipment.

In cases where the system operator has no supervisory control equipment, he is still enabled to check the accuracy of his switching instructions by means of the control board prior to the issuance of instructions to a distant attendant by means of telephone circuits or the like which will result in the operation of the power switching devices.

As the reports come in from the outlying stations through either the medium of supervisory equipment, which records indications automatically, or through telephonic communication channels, the system operator sets up control board signals in such a manner that at all times the board displays the correct or proposed changed indication of the positions of the various switching devices used in the power system.

For the purpose of illustrating the operation of the invention it will be assumed that the system operator desires to close the oil-circuit breaker B010 located in remote station 01, connected to the system operator's station by an intelligence transmitting equipment consisting of the supervisory control system illustrated in Fig. 6.

The signal displayed by symbol B010 with the apparatus in the position corresponding to that shown on the drawings, is an indication that the oil switch B010, under control of automatic devices at the remote station, has been opened. The normal operation of the system requires that the oil switch B010 be closed in order to connect the transformer bank 1 to the circuits of the system and the operator has the mechanism of the dispatch board set to provide for alarm signals in case the switch operates under control of automatic devices at the remote station when the oil switch at the remote station 01 operated under the control of automatic devices (not shown), due to a fault or overload condition on the system, an indication of the tripped condition of the oil switch is immediately transmitted through the medium of the supervisory equipment, such as that shown in the drawings, Fig. 6, to produce the alarm signal condition now set up on the system operator's control board. In case the system operator desires to leave the oil switch B010 open, he selects the symbol B010 on the control board, and sets the notching relay in a position which agrees with the open position of the remote oil switch B010. The alarm signal is then extinguished.

Assuming, however, that the system operator desires to immediately reclose the circuit breaker B010, located at the remote station 01, he will first associate the circuits of his control keys with the circuits of the switch symbol B010 and the supervisory equipment in station 01.

The system operator first operates the locking type key K3, which connects the calling device CD to the circuits of the selector S1.

The selectors S1, shown in Fig. 1, S2 shown in Fig. 2, and S3 shown in Fig. 3, are of the type commonly employed in automatic telephone exchange systems. The circuits are modified, however, to introduce certain features and to operate under the conditions required by this invention. However, their general mechanical construction is not modified. It is believed that the construction and operation of selector switches of this type is too well known to require detailed explanation in this specification.

When the cut-in key K3 is operated there is a circuit completed which extends from positive battery at lever spring 132 and its upper contact, contacts of the calling device CD, back contact and armature 122, and the winding of relay 102 to negative battery. Relay 102 is energized over this path, and at its armature 110 and its front contact completes an energizing circuit for relay 103 via the back contact and armature 109 of relay 101. Relay 103 is of the slow-to-release type and will maintain its armatures attracted during the rapid operation of relay 102 in response to impulses from the calling device CD.

At armature 111 and its contact, one point in the energizing circuit of relay 106 is completed, at armature 112 and its back contact one point in the circuit of the release magnet 107 is opened; while at the front contact of this armature, one point in the series energizing circuit of the relay 105 and the vertical magnet 104 is completed.

The operation of the selector switch S1 will result in associating the system operator's control keys and the calling device CD with the selective equipment circuits common to any one station.

In this case system operator desires to associate the selecting and control equipment with the signalling circuits confined to station O1 as shown on the one-line diagram of the system operator's control board. To do this he is required to dial number 01. The digit 0 has a value of ten impulses and the calling device CD will open and reclose its contacts ten times in transmitting this digit.

The relay 102 will be deenergized each time the contacts of the calling device CD are opened and will be energized when they are again closed. When the contacts of the calling device CD are opened on the first impulse, the relay 102 is deenergized to complete a circuit which extends from positive battery at armature 109 and its back contact, armature 110 and its back contact, armature 111 and its front contact, and the winding of relay 106 to negative battery. Relay 106 is energized over this path, and as it is of the slow-to-release type, will maintain its armatures attracted during the transmission of the impulses comprising the first and second digits.

As another result of the deenergization of the relay 102, there is a circuit completed from positive battery at armature 109 and its back contact, armature 110 and its back contact, armature 112 and its front contact, off-normal springs 117 and 115, and the winding of series relay 105 and vertical magnet 104 to negative battery. The relay 105 and the vertical magnet 104 are energized over this path.

As a result of the energization of the vertical magnet 104 the wiper shaft with which the wipers 125 to 127, inclusive, are associated, will be raised one step. As a result of the operation of the wiper shaft from its normal position, the off-normal springs are moved to their alternate position. In this position springs 113 and 114 close a point in the circuit of the release magnet 107, makes contact with spring 116 and breaks away from spring 115.

As a result of the energization of the relay 105, a second point in the energizing circuit of the rotary magnet 108 is opened at armature 118 and its back contact, while at the front contact of this armature an auxiliary energizing circuit for the relay 105 and the vertical magnet 104 is completed, by way of springs 116 and 117, and will be effective to continue the energization of the relay 105 and the vertical magnet 104 during the transmission of the remaining impulses comprising the first digit.

When the relay 102 is again energized, the operation is only momentary and the relay 105 maintains its armature 118 attracted. The relays 103 and 106 likewise maintain their respective armatures attracted during the short interval between impulses comprising the first digit.

The vertical magnet 104 is energized and deenergized in turn ten times due to the transmission of the impulses comprising the first digit, with the result that the wiper shaft raises its wipers 125 to 127, inclusive, to the tenth level of their respective bank contacts.

During the interval between the first and second series of impulses the relay 102 remains energized for an appreciable period and, consequently, the relay 105 retracts its armature 118.

Due to the deenergization of the relay 105 as described, the series relay 105 and vertical magnet are disassociated from the impulse circuit and relay 105 and the rotary magnet 108 is connected thereto instead.

The second digit to be transmitted by the calling device CD causes the relay 102 to be deenergized and then energized once during the transmission of the second digit. The rotary magnet 108 is accordingly energized to rotate the wiper shaft one step, with the result that the wipers 125 to 127, inclusive, are brought to rest on the first row of bank contacts in their respective banks.

During the interval between the second and third series of impulses, the relay 106 retracts its armatures 120, 123, and 124 to connect the circuits of the wipers 125 to 127, inclusive, to the circuits of the selector S1.

As a result of the operation of the selector switch S1 in the manner described, the wipers 125 to 127, inclusive, have been brought to rest on the first row of contacts in the tenth level of their respective banks.

A circuit is now completed which extends from positive battery at lever spring 132 of key K3 and its lower contact, contacts of the calling device CD, armature 123 and its contact, wiper 125 and its first tenth level bank contact, conductor 152, contact and armature 210, and the winding of relay 202 to negative battery. Relay 202 is energized over this path.

At front contact and armature 212 a circuit is completed to energize relay 203. The relay 203 at armature 216 and its front contact completes an energizing circuit for the relay 101. This circuit includes armature 124 and its back contact, wiper 126 and its resting bank contacts O1, conductor 153, and the front contact and armature 216.

A circuit is now completed which extends from positive battery at lever spring 135 and its contact on key K2, armature 121 and its contact, and the winding of relay 101 to negative battery. The relay 101 is maintained energized under control of key K2 over this circuit, at armature 109 and its front contact a circuit is completed to maintain relay 103 energized independent of relay 102, and at armature 122 and its back contact opens the circuit of the relay 102.

Relay 102, upon deenergizing, at the back contact of armature 110, closes a point in the energizing circuit of the release magnet 107.

The relay 102 is now disconnected from the circuit of the calling device CD, while the relay 202 has been connected thereto, and the selector switch S1 has been locked in its operated position under the control of the key K2.

There is now a circuit completed which extends from positive battery at lever spring 135 and its contact on key K2, armature 119 and its contact, armature 120 and its contact, wiper 127 and bank contact 01, conductor 155, and filament of lamp signal 428 to negative battery. The lamp signal 428 is energized to illuminate the symbol designated 01 on the face equipment of the control board to indicate to the system operator that he has selected the station 01 and that he may proceed to select and operate the controlling circuits of any symbol representing apparatus in station 01.

The relay 251 is energized over conductor 155 in parallel with the energizing circuit just traced, and is a multi-contact relay having eleven sets of make contacts. The armatures 236 to 245, inclusive, associated with the relay 251 are shown connected to the bank contacts representing those in the eighth level of the bank associated with wiper 227. At armature 246 and its front contact an energizing circuit is completed for the relay 260. The relay 260 may be the tenth relay of a group which may be energized in cascade from contacts on similar relays, such as 251. The relay 260 is also of the multi-contact type. Ten relays, such as 251 and 260, may be energized in this same manner to connect the circuits controlled by their armatures and their front contacts to the one hundred contacts associated with the switch bank accessible to the wiper 227.

There may be one hundred groups of switches selectable by wiper 227 and each contact on this bank must be connected in such a manner that the wiper 227 may complete one point in the selecting circuit of any one group of such relays.

The apparatus for controlling symbols having the prefix B is made available to the operator by way of the eighth contact level of switch S2. The system operator, therefore, must transmit a series of eight impulses to this switch, followed by an impulse series corresponding to the first digit of the represented switch number, which in this case is "0" having the value of ten impulses.

The relays 202, 203, 205 and 206, as well as the vertical, rotary and relay magnets 204, 207 and 208, respectively, perform the same function in the circuits of the switch S2 as do corresponding elements of the switch S1. It is, therefore, sufficient to mention that, responsive to the transmission of the impulse series 8 and 0, respectively, the switch S2 positions its wipers upon their tenth contact sets in their eighth bank level.

The relay 202 remains energized at the end of the transmission of the impulses comprising the fourth digit. As a result, the energizing circuit of the slow-to-release relay 206 is opened at back contact and armature 212 for a sufficient period of time to allow this relay to retract its armatures 224 to 226, inclusive.

The impulse conductor 152 which formerly merely extended to relay 202 now extends to the impulsing relay 302 of switch S3, by way of armature 226 and its back contact, wiper 229, and its resting bank contact, conductor 232, and the winding of relay 302 to negative battery. Relay 302 upon energizing, at armature 313 and its front contact a circuit is completed to cause the energization of the relay 303. This latter relay at its armature 316 completes a circuit which includes conductor 233, resting bank contact 80 and the wiper 228, and armature 225 and its back contact, and the winding of relay 201. Relay 201, upon energizing, brings about circuit changes in S2 corresponding to those brought in S1 consequent to the energization of its relay 101.

Since the relay 302 has now been substituted for relay 201, the impulses transmitted by the calling device CD, when it is operated to transmit the fifth and sixth digits of the required selection, will result in the operation of the relay 302 associated with the switch S3.

The switch S3 is like S2, except that since S3 is the final switch of the train, no relay corresponding to 201 of S2 is required, the impulsing relay 302 being tied directly and permanently to the impulse lead 232.

Since the number of the symbol being selected is B010 of station 01 the fifth and sixth impulse series will comprise 1 and 10 circuit interruptions, respectively, of relay 302. This relay, accordingly, causes the switch S3 to position its wipers upon their tenth contact sets in the first level of bank contacts.

The relay 302 remains energized at the end of the transmission of the impulses comprising the sixth digit.

The energizing circuit of the relay 305 is opened at back contact and armature 313 at the end of the transmission of the impulses and this relay retracts its armatures after a slight interval of time to control circuits including the wipers 363 and 364.

One of these circuits when completed, extends from positive battery at the tenth bank contact and its wiper 364, armature 319 and its back contact, conductor 231, and the winding of relay 209 to negative battery. Relay 209 is energized over this path and completes a circuit from positive battery at armature 213 and its front contact, over the front contact and armature 223, back contact and armature 224, wiper 227 and its bank contact 80, armature 236 and its contact, conductor 234, and the winding of relay 321 to negative battery.

The relay 321 is of the multi-contact type and usually is arranged to attract eleven sets of armatures as shown in the drawings, Fig. 3. A circuit through the make contacts on one of these armatures is used to energize a relay of similar construction and that relay in turn energizes a third relay and so on until when these multi-contact relays are energized as a result of the energization of the first relay 321. An energizing circuit is shown for another relay 330 at armature 361 and its front contact. When these relays are energized the contacts accessible to the wiper 363 are connected to the circuits of the notching-relay devices which are used to in turn control the lamp signals on the control board.

The relays such as 321 and 330 are termed group selecting relays and in case there are only two groups of ten switch circuits to be connected in station 01, only two relays would be used. It is, therefore, only necessary to use enough group relays to complete the circuits for the notching relays selectable at each station.

The relays 331 and 340 are connected to the bank contact 81 of the switch S2 over conductor 235, and the relays 321 and 330 are connected to bank contact 80 on the switch banks of the switch S2 over conductor 234.

In case the system operator desires to check the accuracy of his selecting devices, he will first operate the key K4 in such manner that the lever spring 131 closes contact and completes a circuit from positive battery at the commutator of the high speed interrupter 140, spring 131 and its contact, conductor 154, armature 318 and its contact, wiper 363 and its bank contact 10, front contact and armature 341, conductor 371, and the winding of magnet 8010, which is the motor magnet of the notching relay individual to the symbol B010. This magnet will now be intermittently energized over the path just traced.

The lamp signals and auxiliary circuits of the control board are arranged to be controlled by circuits completed by cam actuated contacts on the notching relay devices. The mechanical construction of these devices may be similar to that described in the pending United States application of Riebe et al., Serial No. 391,326, filed September 9, 1929.

The arrangement of the cams and their positions is shown diagrammatically in Fig. 5. When the cams are rotated to position 4, the contacts and springs assume the positions illustrated as normal in Fig. 5. The cams illustrated have their positions numbered in accordance with the four positions to which they may be moved and the contact spring positions for any position of the cams can, therefore, be readily determined. The notched wheel has four teeth and actuates the cams to assume four different positions.

When the motor magnet 8010 is first energized the cams such as 51, 52, and 53 associated with the notching relay magnet 8010 are moved into position 1.

With the cams in position 1 the spring 541 closes contact with its upper spring, spring 543 breaks contact with its lower spring, spring 576 breaks away from its lower spring, and spring 544 breaks contact with its lower spring and closes contact with its upper spring. There is now a circuit completed which extends from positive battery at contact 541, and the filament of the red lamp 542 to negative battery. The symbol B010 is accordingly illuminated by both the green and the red lamps at this time. At spring 544 the circuit over which the white lamp 594 was energized is opened and this lamp is extinguished.

The next operation of the magnet 8010 causes the movement of the cams into position No. 2. With the cams in this position the circuit for energizing the red lamp signal 542 is opened at springs 541.

The next energization of the stepping magnet 8010 causes the cams to be operated into position 3. In this position springs 546 close a point in the operating circuit of relay 506.

The cam spring combinations under control of magnet 8010, selected to control symbol B010, are shown in their normal position, which is position four according to Fig. 5. To simplify the disclosure the cams have been omitted in Fig. 4, and instead the springs have associated therewith small numerals designating the various positions of their cams at which the springs change their position.

The next operation of the stepping magnet 8010 brings the cams into position to restore their springs to the position in which they are shown diagrammatically in Fig. 5. As previously explained, with the cams in this position, the green lamp and the white lamp signal 594 are energized.

As the operation of the stepping magnet 8010 continues, it will be seen that the color of the symbol B010 is changed and that the lamp signal 594 will be energized and deenergized to flash signals associated with the symbol B010 and to indicate to the system operator that he has selected this circuit for operation.

Having checked the accuracy of his selecting devices, the operator will now restore the key K4 to its normal position. He may then throw the key K4 to the opposite position to cause the spring 130 to make contact with its associated spring and again operate the stepping magnet 8010 by momentary operation of the key K4 in this manner. This permits him to set the cams of the notching relay in the position to cause the associated symbol B010 to display any desired signal.

In order to close the oil switch B010 at the remote station the switch symbol B010 on the control board must display a green indication to indicate that the oil switch is open and the alarm or disagreement symbol A of lamp 594 must be energized to indicate that the position of the oil switch B010 at the remote station disagrees with the setting of the notching relay as indicated by the symbols of the control board.

The dispatcher will, therefore, operate the stepping magnet 8010 to bring the cams to rest in position 4 which is the position illustrated diagrammatically in Fig. 5.

The dispatcher will now operate the key K5 to complete a circuit which extends from negative battery at the contacts of the key spring 129, conductor 156, winding of the relay 507, contact springs 576, spring 544 and its lower contact, and armature 521 and its contact to positive battery. The relay 507 is energized over this path and completes a circuit from the negative pole of the split 60 volt battery in the lower portion of Fig. 6, conductor 533, the contact and armature 518, conductor 534, bank contact 1, its wiper 652, line I, wiper 657 and its contact 1, and the winding of relay 606 to common conductor CM and then to positive 60 volt battery.

Upon the energization of the relay 606, the supervisory control equipment shown in Fig. 6 is started into operation. This supervisory control equipment is of the synchronous type, but is normally at rest. The wipers 651 to 655, inclusive, are fastened to a common shaft which is operated in a step-by-step manner over the contacts of the switch banks when the stepping magnet 603 is energized and deenergized. The wipers 656 to 660, inclusive, at the remote station are similarly fastened to a common shaft and are operated over their bank contacts when the stepping magnet 608 is energized and deenergized.

The synchronous selector system is divided essentially into three independent circuits which may be designated as the control, indication, and synchronizing circuits, all three of which use a common return line conductor. The system operator controls the supervised units in the substation over the control circuit, and the indication from the supervised units are returned to the operator over the indication circuit. The equipment at the substation is made to operate in synchronism with the equipment at the operator's office by means of current impulses sent over the synchronizing circuit. Line C is the control circuit conductor, the other part of the circuit being the common return conductor CM. Line I is the indication circuit conductor, the other side of this circuit being completed by the line conductor CM. Line S is the synchronizing circuit, the other side of this circuit being also completed over the common return conductor CM.

The relays 604 and 605 are of the locking two-position polarized type. These relays are used to operate in response to alternate positive and negative impulses sent over the synchronizing line. The contacts complete the circuits for the driving magnets of these selectors. The relay 601 is of the same type and is used to energize lamp signals to indicate the position of the remote device. The locking polar-type relay, when operated to either of its two positions, maintains that position until current is reversed through its winding.

The supervisory control equipment as shown in Fig. 6 is in the 0 position, with all apparatus at rest. Due to the energization of the relay 606, a circuit is completed from the positive terminal of the split battery at the remote station, conductor 675 front contact and armature 626, the bank contact and wiper 660, winding of relay 605, line S, winding of relay 604, wiper 655 and its bank contact, conductor 533, the negative terminal of the split battery at the operator's station, through this battery and thence over the line conductor CM to the mid-point of the split battery at the remote station. The relays 604 and 605 are energized in series over this path in such manner that the armature 620 makes contact with the spring 622, and the armature 625 makes contact with its contact 623.

At the remote station, a circuit is now completed which extends from positive battery on the bank contact and wiper 659, winding of magnet 608, and armature 625 and its contact 623 to negative battery. The stepping magnet 608 is energized over this path and moves its wipers one step.

At the dispatcher's station a circuit is completed which extends from positive battery at contact and wiper 654, winding of relay 603, and armature 620 and its contact 622 to negative battery. The stepping magnet 603 is energized over this path to move its wipers one step.

As a result of the movement of the wipers to the second contacts of their respective banks, there is now a circuit completed to energize the relays 604 and 605 in the opposite direction and to move the armatures 620 and 625 back to the position indicated in Fig. 6. This circuit may be traced from the positive terminal of the split battery at the operator's station, bank contact 2 and wiper 655, relay 604, line S, winding of relay 605, wiper 660 and its second bank contact, negative terminal of the split battery at the remote station, and line CM which connects the midpoints of the batteries at the operator's station and the remote station. During the movement of the armature 620 from contact 622 to contact 621, the energizing circuit of the stepping magnet 603 is opened and the magnet positions its pawl and ratchet mechanism in such position that the wiper shaft will be moved another step when the stepping magnet is again energized. Likewise at the remote station during the movement of the armature 625 from contact 623 to contact 624 the energizing circuit of the stepping magnet 608 is opened and this magnet positions its pawl and ratchet mechanism to again cause the movement of the wiper shaft when the magnet is again energized.

There is now a circuit completed which extends from negative battery at bank contact and wiper 659, winding of stepping magnet 608, and armature 625 and contact 624 to positive battery. The stepping magnet 608 is energized over this path to move the wipers from their second to their third bank contacts.

At the operator's station, there is now a circuit completed from positive battery at contact and armature 620, winding of the stepping magnet 603, wiper 654 and its second contact to the negative terminal of the battery. The stepping magnet 603 is energized over this path and advances its wipers to their third bank contact.

The wipers at both the operator's station and the remote station now rest the third bank contacts of their respective switch banks. The contacts accessible to the wiper 655 at the operator's station, are arranged to be alternately connected to the negative and positive terminals of the split battery, the first contacts being connected to the negative battery, second to positive battery, third to negative battery, and the fourth to positive battery and so on. It will be seen, however, that the connection to the contacts on the banks accessible to the wiper 655 may be completed through the contacts of certain relays which in turn are controlled by the operator through the medium of the notching relay devices shown in Figs. 4 and 5 and keys located at this position.

At the remote station the contacts accessible to the wiper 660 are alternately connected to negative and positive battery, negative being connected to the odd terminals and positive to the even terminals or contacts on the switch banks accessible to this wiper. The connection of positive battery to the first bank contact is controlled by the armature 626 on the relay 606 in order to provide the circuit which starts the synchronous operation into motion.

The magnet 603 and the wiper 654 are similarly connected alternately to both positive and negative battery in order that a circuit for energizing the stepping magnet can only be completed in case the armature 620 is operated to the correct position by the current which flows through the winding of the magnet 604. At the remote station, the armature 625 of the relay 605, and the wiper 659 which controls the circuit of the relay 608, are connected to alternate terminals of the storage battery in such manner that the magnet 608 can only be energized when the armature 625 assumes the correct position due to the direction of the current which flows through the winding of the relay 605.

In this manner the selector at the operator's station and the remote station are caused to be operated in a step-by-step manner in synchronism.

It will be seen that the connection to negative battery on the third contact of the bank associated with wiper 655, is controlled over conductor 425, contact and armature 414, and thence over conductor 424 to negative battery. Thus if the relay 405 is energized, one point in this circuit is opened at armature 414 with the result that the relays 604 and 605 will not be energized in series to control the movement of the wipers in the manner described. The result is that the wipers 651 to 655, inclusive, at the system operator's station, remain on their third contact of their respective switch banks, and the wipers 655 to 660 at the station remain on the third contact of their respective banks.

It will be seen, therefore, that the operation of the synchronizing circuit may be stopped to hold the wipers on any position by maintaining one side of the synchronizing circuit opened at the certain bank contacts accessible to the wiper 655.

In this manner the synchronous operation of the selectors may be stopped at any desired point.

In the present instance it will be assumed, however, that the relay 405 is deenergized and that the synchronous operation of the selector continues until the wipers at both the operator's station and the remote station reach their eighth bank contacts. The operator may permit the selecting action to continue from any point after the action has been stopped, due to the energization of a relay such as 405, by a momentary release of key K5 which opens one side of the energizing circuit of the relays such as 405 and 507.

The relay 507 is energized over a path previously traced due to the operation of the key K5 and when the wipers come to rest on the eighth contact of their respective switch banks, the circuit over which relays 604 and 605 may be energized in series is opened at armature 516. As a result the synchronous operation is stopped with the wipers at both the remote station and the operator's station resting on the eighth contact of their respective switch banks.

There is now a circuit completed which extends from the positive terminal of the split battery at the remote station, conductor 675, contacts 682 of the pallet switch of the breaker B010, the eighth bank contact and its wiper 657, line I, wiper 652 and its eighth bank contact, winding of the relay 691, conductor 674, and line conductor CM to the mid-point of the split battery at the remote station. The relay 691 is energized over this path and attracts its armature 618 to the position shown in Fig. 6, so that this armature makes contact with its spring contact 617. This operation of the relay 691 is without effect since the relay already had its armature in the position in which it is shown on the drawing. The breaker B010 is open and an indication is so registered at the operator's station. Due to the position of the armature of the relay 691, there is a circuit completed which extends from positive battery at armature 618 and its contact 617, conductor 532, and the winding of the relay 505 to negative battery. The relay 505 is energized over this path and at front contact and armature 521 maintains the previously traced circuit completed to cause the energization of the green lamp signal 543 of symbol B010 to indicate that the oil switch B010 is open.

In order to close the oil switch B010 the operator now operates the master control key K1. As a result there is a circuit completed which extends from positive battery at springs 136, conductor 151, and the winding of relay 602 to negative battery. Relay 602 is energized over this path to complete a circuit from the positive terminal of the split battery at the operator's station, conductor 536, contact and armature 595, armature 517 and its contact, conductor 535, the eighth bank contact and its wiper 651, contact and armature 619, line C, wiper 656 at the remote station and its eighth bank contact, winding of the relay 611, and line conductor CM to the mid-point of the split battery at the operator's station. The relay 611 is energized over this path to attract its armature in position to close a circuit between the armature 652 and contact 651 to extend positive battery at armature 652 and its contact 651, to the winding of the contactor 612 and negative battery.

The contactor 612 is energized to close a circuit which will cause the energization of the solenoid 615 to close the oil switch B010.

The oil switch B010 is operated electrically by 615, but is latched mechanically under control of a trip mechanism, not shown.

A circuit is now also completed from the negative terminal of the split battery at the remote station, conductor 683, contacts and armature 683' of the pallet switch, the eighth bank contact and its wiper 657, line I, wiper 652 and its eighth bank contact at the operator's station, winding of the relay 601, and line conductor CM to the mid-point of the split battery at the remote station.

The relay 601 is energized over this path in such manner that the armature 618 is attracted to the opposite position from that shown in Fig. 6 to close contact with the spring 616. When armature 618 breaks contact with the spring 617, the formerly traced energizing circuit of the relay 505 is opened and this latter relay deenergizes. As a result, the energizing circuit of the green lamp signal is opened at the armature 521. The traced energizing circuit of the white lamp 544 is also opened at the same point.

The green lamp and the white alarm lamp associated with the symbol B010 are now extinguished and this symbol is dark, which indicates to the operator that the oil switch B010 has been operated to its closed position. He now restores the master key K1 to its normal position to open the energizing circuit of the relay 602. When relay 602 is deenergized, the energizing circuit of the relay 611 at the remote station is opened and this relay restores its armature 652 to the neutral position, mid-way between contacts 651 and 653.

Since the energizing circuit of the contact 612 is now open, this contactor deenergizes to in turn open the energizing circuit of the solenoid 615.

Assuming now that the operator desires to open the oil switch B010, he must operate the key K4 to momentarily close contact between springs 130 a required number of times to energize the stepping magnet 8010 of the notching relay 23 required to position the cams in position No. 3, at which point springs 546 close, springs 543 open, and the spring 544 breaks away from its lower contact and makes with its upper contact. There is now a circuit completed from positive battery on armature 618 and its contact 616, conductor 531, contact and armature 522, upper contact and spring 544, and the lamp 594 to negative battery. The lamp 594 is energized over this path to illuminate the alarm symbol associated with the switch symbol B010 to indicate to the operator that the setting on the notching relay disagrees with the position of the breaker at the remote station. In this way it indicates to him that he may now trip the oil switch B010.

The operator will now operate the master control key K1 to again complete the circuit of relay 602.

Upon the operation of key K1, a circuit is also completed from positive battery at the springs 546, the notching relay driven by magnet 8010, and the winding of relay 506, front contact and armature 519, conductor 156, spring 129 and its contact to negative battery. The relay 506 is energized over this path and completes a circuit which extends from the negative terminal of the split battery at the operator's station, conductor 533, contact and armature 515, conductor 535, the eighth bank contact and wiper 651, contact and armature 619, line C, wiper 656 and its resting bank contact 8, winding of relay 611, line conductor CM to the mid-point of the split battery at the dispatcher's station. The relay 611 is energized over this path in such manner that the armature 652 closes a circuit with contact 653, and the contactor 613 accordingly is energized. There is now a circuit completed from the positive 220 volt battery at contacts 681 of the pallet switch of the breaker B010, contacts of the contactor 613, and winding of the solenoid 614 to negative battery. The solenoid 614 is energized over this path to trip the oil switch B010 and to restore this switch to the position illustrated conventionally in the drawings, Fig. 6.

There is now a circuit completed from positive terminal of the split battery at the remote station, conductor 675, contacts 682 of the pallet switch, the eighth bank contact and wiper 657, line I, wiper 652 and its eighth bank contact, winding of the relay 601 and line CM to the midpoint of the split battery at the remote station. The relay 601 is energized over this path in such manner that the armature 618 takes the position indicated in the drawings, Fig. 6. There is now a circuit completed from positive battery at armature 618 and its contact 617, conductor 532, and the winding of relay 505 to negative battery. Relay 505 upon energizing, at back contact and armature 522, opens the circuit of the alarm lamp 594 and this signal, accordingly, is extinguished, while at armature 521 the formerly traced circuit of the green lamp 583 is again completed to illuminate the symbol B010 to indicate to the operator that the oil switch B010 is again in its tripped position.

The operator now restores the keys K1 and K5 to their normal positions. Consequent to the restoration of key K1 the relay 602 is deenergized, and at its armature 519 opens the circuit of relay 611. The relay 611, upon deenergizing, returns its armature 552 to its said position. The contactor 613 accordingly deenergizes and interrupts the current flow through solenoid 614. The circuits and apparatus associated with the oil switch B010 are now in the position shown in the drawings.

The return of key K5 to its normal position, opens the energizing circuit of the relay 507 and this relay deenergizes, at contact and armature 519 opens the circuit of relay 506 and this latter relay, therefore, also deenergizes. The deenergization of the relay 506 at armature 517 and its front contact opens another point in the energizing circuit of the relay 611 which, however, is also controlled by relay 602, at the back contact of armature 516 a circuit is completed from the positive terminal of the split battery at the operator's station on conductor 536, back contact and armature 516, conductor 537, eighth bank contact and wiper 655, winding of the relay 604, line S, winding of the relay 605, wiper 660 and its eighth bank contact to the negative terminal of the split battery at the remote station, and line conductor CM to the mid-point of the battery at the operator's station. The relays 604 and 605 are energized over this path to complete circuits, such as previously traced, to step the wipers from their eighth to ninth bank contacts, and to continue the synchronous operation of the selectors at both the operator's station and the remote station until the wipers again rest on the first bank contacts. When the wipers rest on their respective first bank contacts there is no further circuit to cause the energization of the relays 604 and 605 in series so long as relays such as 507 and 405 remain deenergized.

The symbol B110 and its associated circuits are also shown connected to the supervisory control equipment. The relays 403, 404, and 405 are operated in a manner similar to relays 505, 506, and 507, and the operation of the circuits for opening and closing an oil switch, such as B110 illustrated in Fig. 6, are identically the same as those just described. Only the pallet switch of the oil switch B110 is shown, as the remaining circuits of the oil switch are identical to those of oil switch B010.

When the symbol B010 registers the closed position the operator has an alarm indication on the symbol B010 and, in case he does not wish a further operation of the oil switch B010, he should wipe out the alarm signal by operation of the stepping magnet B010 to set the cams in a position to agree with the tripped condition of the oil switch. He, therefore, operates the stepping magnet B010 in such manner that the cams are rotated into position 3. As a result, the energizing circuit of the lamp signal 594 is opened at armature spring 544 and its lower contact.

Under this condition, if the oil switch B010 should trip out under control of automatic devices, not shown, the supervisory equipment will operate in the same manner as before described, except that the operation is started by the operation of the pallet switch. When the wiper 658 is on its third bank contact, a circuit is completed which extends from the mid-point of the battery at the remote station, conductors CM and 670, wiper 658 and its third bank contact, winding of relay 609, contact of the pallet switch associated with the breaker B110, to conductor 675 and the positive terminal of the split battery. The relay 609 is energized over this path to complete a holding circuit for itself at armature 628 and its front contact, which is independent of wiper 658. Any movement of the pallet switch associated with the breaker B110 will, however, momentarily open this circuit and cause the deenergization of the relay 609.

The relay 610 is similarly energized when the wiper 658 comes to rest on its eighth bank contact and is maintained in an energized position under control of the contacts of the pallet switch associated with the breaker B010.

When the oil switch B010 trips out under control of automatic devices not shown, the relay 610 is deenergized with the result that a circuit is completed which extends from positive battery on conductor 675, contacts 682 of the pallet switch, armature 631 and contact, winding of the relay 607 to the mid-point of the split battery at the remote station. The relay 607 is energized over this path to complete circuits which cause the synchronous selector to operate. This circuit is in parallel with that which may be completed by the relay 606, which has previously been described.

The operation of the control board equipment is the same as previously described and when the wipers at both the remote station and the operator's station come to rest on the eighth bank contact of their respective switch banks a circuit is completed to again cause the energization of the relay 601. The relay 601 controls the control board equipment in the same manner as before described. Under this condition if the setting of the cams on the notching relay is such that the symbol B010 is dark to indicate the closed position of the switch, a circuit is completed to energize the green lamp signal and to energize the alarm lamp signal which indicates to the operator that an operation has occurred under control of automatic devices at the remote station.

The operator can then select and set the notching relay of symbol B010 to a position which agrees with the position of the remote oil switch, or can reclose the oil switch in the same manner as previously described.

It will be seen that when the relay 505 is energized, one point in the energizing circuit of the relay 507 is opened at armature 522. This circuit is to prevent the operation of the oil switch at the remote station until a disagreement condition, as indicated by the illumination of the alarm symbol A, associated with the symbol B010 has been set up.

Referring now more particularly to the circuits of the notching relays shown in Figs. 4 and 5, the operation of the tell-tale indications which are automatically effective when an operation takes place under control of the supervisory equipment or under control of the operator, will be described.

The line disconnect B011 is in its closed position as neither of the lamps 595 nor 596 is energized. The oil switch B010 is in its open or tripped position as indicated by the illumination of the symbol by the energized lamp 583. The bus disconnect B012 is in its closed position, as the symbol is dark. The bypass switch B017 is in its open position. There is a circuit completed from positive battery at spring 586 and its working contact, and the lamp 584 to negative battery. The symbol B017 is accordingly illuminated to indicate the open condition of this switch. The symbol B111 indicates a closed switch as the symbol is dark. The symbol B110 indicates an open switch as the green and white lamps are energized. The symbol B113 indicates a closed switch as neither of the lamps is energized. The symbol B114 indicates an open switch since a circuit is completed to cause the energization of the green lamp 471 over the path which includes contact and spring 473.

The bus tell-tale relay 402 is deenergized at this time and, therefore, a circuit is completed from positive battery on the interrupted conductor 2, back contact and armature 407 to lamp 451 and negative battery. The energizing circuit of the red lamp 451 is intermittently opened and closed over this path to display a flashing red indication on the symbol 453 to indicate to the operator that the main bus is dead.

The relay 401 is also deenergized at this time and a circuit is completed from the interrupted conductor 2 to cause the flashing signal to be displayed on the transfer bus tell-tale symbol 454 in a similar manner to indicate that this bus is dead. The lamp 599 associated with the bank symbol or transformer bank 1 is deenergized and the bank symbol is dark to indicate that the transformer bank is out of service.

It will now be assumed that the oil switch B010 is closed with the result that a supervisory signal is transmitted to the operator's station to indicate this condition. The relay 505 is deenergized as a result of the operation of the relay 601, at contact and armature 521 the energizing circuit of the green lamp signal and the white alarm lamp signal is opened and these signals are extinguished. The symbol B010, therefore, now displays an indication that the oil switch B010 is in its closed position.

To explain how the tell-tale signals operate, let us assume that there is energy on the power circuit at the point represented by the line side of the disconnect B011. Energy on the one-line diagram is represented by a connection to positive battery on the contact of the notching relays. The notching relay springs 561, 543, 562, 563, 461, 432, 462, and 463, are those which control the auxiliary or tell-tale circuits.

With the circuits in the conditions stated, there is a circuit completed from positive battery at the springs 561, spring 543 and its lower contact, contact and armature 520, spring 563 and its contact, and the winding of relay 501 to negative battery. The relay 501, upon energizing, at front contact and armature 508 a circuit is completed to cause the energization of the relay 504. There is now a circuit completed from positive battery at front contact and armature 514, armature, armature 509 and its contact, and the red lamp 599 to negative battery. The lamp causes the display of a steady red indication on the symbol designated bank 1 to indicate to the operator that the transformer bank has been energized.

With the oil switch B110 closed the relay 403 is deenergized, its circuit being open at the armature of relay 601', as illustrated. There is now a circuit completed from positive battery at spring 461 and its contact, spring 432 and its contact, contact and armature 408, spring 463 and its contact, conductor 417, and the winding of relay 502 to negative battery. The relay 502 is energized over this path, and at armature 510 connects positive battery by way of armature 508, conductor 416 and the main bus to the relay 402 and negative battery. Upon the energization of relay 402, the lamp 451 is energized from positive battery at the front contact and armature 407 and the main bus tell-tale symbol 453 displays a steady red signal to indicate to the operator that this bus has been energized.

Assuming now that the oil switch B010 is again opened and that the indication is set up on the operator's control board by the operation of the relay 505 and circuits previously described. The energizing circuit of the relay 501 will be opened at armature 520 and its back contact, and the relay 501 will deenergize.

The oil switch B110, however remains closed at this time and the relay 502 accordingly remains energized. When the relay 501 is deenergized, the relay 504 is in turn deenergized since its energizing circuit is opened at front contact and armature 508.

Under this condition there is now a circuit completed from the interrupted positive battery on conductor 2 at back contact and armature 514, armature 511 and its front contact, and the lamp 599 to negative battery. The lamp 599 is intermittently energized over this path to display a flashing red indication on the symbol designated bank 1 and to indicate to the operator that the transformer bank is connected to the bus but the bank is dead.

The relay 402 is deenergized when its circuit is opened at contact and armature 508 and the symbol 453 displays a flashing red signal to indicate to the operator that the main bus is dead.

Assuming now that the oil switch B010 is closed and the relay 501 is again energized. The transformer bank symbol will again display a steady red indication due to the energization of the relay 504 and the circuit previously described. Now under this condition if the operator should open the disconnect B011 or the disconnect B012 the energizing circuit of the relay 501 will again be opened with the result that the transformer bank will display a flashing red indication.

When the relay 501 is energized, and the relay 503 is energized by the operation of the notching relay associated with the symbol B114, the relay 503 is energized by circuits closed at springs 461 and 462 and their contacts. The relay 401 is now energized over a path which includes the contact and armature 508, contact and armature 512, conductor 418, and the main bus. When the relay 401 is energized, the energizing circuit of the lamp signal 452 is transferred from the interrupted positive battery at armature 406 to steady positive battery. The symbol 454, therefore, displays a steady red indication to the operator that the transfer bus has been energized.

It will be apparent from the circuits described thus far that the relay 504 may be energized by positive battery from the main or transfer bus over conductor 416 or 418 in case either relay 502 or 503 is energized.

In the manner described, the operator receives an indication on the transformer bank symbol to tell him when the bank is out of service, when it is connected to either bus and not energized therefrom, and when it is energized and connected to the main or transfer buses to furnish energy to the system.

If the operator now desires to return the selective equipment to its normal position, he restores the key K3 to its normal position. As a result, the energizing circuit of the relay 302 is opened and this relay deenergizes.

As a result of the deenergization of the relay 302, the energizing circuit of the relay 303 is opened and, therefore, this relay also deenergizes.

The relay 303 retracts its armatures after a slight interval of time to complete a circuit from positive battery at armature 313 and its back contact, armature 315 and its back contact, off-normal springs 308 and 309, and the winding of release magnet 307 to negative battery. The release magnet 307 is energized over this path and operates a trip mechanism to restore the wiper shaft and its associated wipers to their normal positions.

With the wiper shaft in its normal position the off-normal springs are returned to the position indicated in the drawings, Fig. 3, and the energizing circuit of the release magnet 307 is opened at springs 308 and 309. The circuits and mechanism of the switch S3 are now in their normal position.

As a further result of the deenergization of the relay 302, one point in the energizing circuit of the relay 201 is opened at contact and armature 316. Relay 201 is now deenergized to in turn open the energizing circuit of the relay 203. The relay 203 retracts its armature after a slight interval of time to complete a circuit from positive battery at armature 211 and its back contact, armature 212 and its back contact, armature 214 and its back contact, off-normal springs 217 and 218, and the winding of the release magnet 207 to negative battery. The release magnet 207 is energized over this path to operate a trip mechanism and restore the wiper shaft and its associated wipers to their normal positions.

When the wiper shaft is in its normal position, the off-normal springs are returned to the position indicated in Fig. 2. The energizing circuit of the release magnet is opened at off-normal springs 217 and 218. All circuits of the switch S2 are now in their normal positions.

As a result of the deenergization of the relay 203 and the return to normal of the circuits of the switch S2 the energizing circuit of the relay 321 is opened and this relay is deenergized to disconnect its circuits from the contacts accessible to the wiper 363 of the switch S3.

As a further result of the deenergization of the relay 203 in the manner described, the energizing circuit of the relay 101 is opened at armature 216. However, the relay 101 is still maintained energized under control of the key K2.

It will be evident from the circuits described that the operator may now select any other switch circuit in station 01 simply by dialling the full digit of the switch number as indicated by the designation on the symbol of the one-line diagram.

If, however, he desires to release the station selector S1, he operates the key K2 to momentarily open the circuit at spring 135 and as a result, the energizing circuit of the relay 101 is opened and this relay is deenergized.

When relay 101 is deenergized, the energizing circuit of the relay 103 is opened at front contact and armature 109. The relay 103 retracts its armatures after a slight interval of time to close a circuit from positive battery at armature 109 and its back contact, armature 110 and its back contact, armature 112 and its back contact, off-normal springs 113 and 114, and the winding of the release magnet 107 to negative battery. The release magnet 107 is energized over this path to operate the trip mechanism and restore the switch wiper and its associated circuits to their normal positions.

When the wiper shaft is in its normal position the off-normal springs 113 and 114 are open and the energizing circuit of the release magnet is opened at this point. The circuits and apparatus of the switch S1 are now restored to normal position. As a further result of the deenergization of relay 103 and the operation of the switch S1 in restoring, the energizing circuit of the relay 251 is opened and this relay is deenergized. When relay 251 is deenergized circuits of its armatures are disconnected from the contacts accessible to the wiper 227 of the switch S2.

The energizing circuit of the lamp signal 428, associated with station symbol 01, is opened at front contact and armature 119 and by the restoration S1 to its normal position with the result that the lamp signal is extinguished. All apparatus is now in its normal position as at the beginning of the description of operations.

The tell-tale signal circuits and their operation in connection with the one-line diagram on the operator's control board will now be described in connection with the apparatus and circuits conventionally shown in Figs. 7 and 8. The contacts shown opposite the numbered switch symbols in Figs. 7 and 8 are the auxiliary contacts on the notching relays which are always closed when the switch symbol indicates a closed condition whether it is due to a relay operation through the medium of supervisory equipment or whether it is a condition set up due to the operation of the notching relay by the operator's control key. These same contacts are always open when the symbol indicates an open or a hold condition.

It will be noted that the circuits controlled by the springs 432, on the notching relay which controls the circuits of the symbol B110, are connected in series through contacts controlled by the armature 408 on the relay 403. Relay 403 is always energized when the oil switch is in the open or tripped position. Likewise, the tell-tale circuits which are controlled by springs 543 are also connected in series with armature 520 on relay 505 in such manner that when the relay 505 is energized to display the open or "hold" condition, these tell-tale circuits are also open.

When the notching relay is actuated by the operator to set up a hold or tripped condition, or in fact any other position than that necessary to indicate the closed condition on the switch symbol, the tell-tale contacts are open.

The energy from a generating source or an interconnection is always represented by positive battery connected to the contact of the notching relay at a point equivalent to that at which the energy would be connected to the system.

On the drawings, Figs. 7 and 8, the tell-tale circuit contacts are shown directly opposite corresponding switch symbols, and the circuit arrangement is in schematic form to permit simplification of the explanation. Where more than one set of contacts are used with a switch symbol, the sets have been designated A, B, and C, etc.

In order to provide the required tell-tale indications, both relays and contacts on notching relays are used as illustrated in the drawings.

Any source of energy supply to the system such as generator G1 in station 61 and the interconnection at LaSalle requires a connection to positive battery at the tell-tale contacts as shown at contacts 1300C and 2007A.

The generator symbol G1 may display three tell-tale indications, automatically controlled by the notching relays, which cause the display of open, closed, or hold conditions on oil switch symbol 1300 and disconnect symbol 1302.

It is desired that the generator symbol display a signal to indicate energy available but not in use when the disconnect 1302 is closed and oil switch 1300 is open.

When the symbol 1302 is illuminated by its red lamp to indicated closed disconnect, the contacts 1302A, 1302B, and 1302C are closed; and when the symbol 1300 is illuminated by its green lamp the contacts 1300A, 1300B, and 1300C are open.

Under this condition a circuit is completed which extends from negative battery at back contact and armature 733, contact 1302A, and filament of lamp signal 746 to positive battery. The signal 746 is energized to illuminate the generator symbol G1. This indicates to the operator that there is energy available but not in use.

The lamp signals 747 and 746 are not visually energized in series by the connection shown in Fig. 7, because of the high resistance of the filaments.

When the oil switch symbol 1300 and the disconnect symbol 1302 both display open indications, the generator symbol G1 is dark, indicating the shut-down condition of the generator. When the green lamp is energized on the switch symbols 1300 and 1302 the contacts 1302—A and 1300—A are open, there is no circuit for energizing either of the lamp signals 747 and 746, except the high resistance circuit of the filaments in series.

When the oil switch symbols 1300 and 1302 register a closed condition of these switches the red lamp on each symbol is energized and contacts 1300—A, 1300—B, 1300—C, 1302—A, 1302—B, and 1302—C are closed. There is now a circuit completed to cause the energization of the relay 702; and at the front contact and armature 733 a circuit is completed, which includes positive battery and spring contacts 1302—A and 1300—A for energizing the lamp signal 747. The symbol G1 is then illuminated a steady red as an indication that the generator is supplying energy to the 13.2 kv. bus, shown in Fig. 7.

The relay 701 may be energized either through a circuit which includes 1300—C and 1302—C, or from circuits controlled by armatures on the relays 703 to 705, inclusive, but when the relay 701 is in its deenergized position the lamp signal 739 is energized from the interrupter circuit completed at back contact and armature 734. This causes the flashing red signal indication on the symbol 740, which indicates that the bus is dead.

Three indications are desirable in connection with transformer banks such as bank 1 and bank 2 shown in Fig. 7. These indications must be automatically operative as a result of the display of switch position indications on the various symbols representing the switching equipment. The transformer bank must indicate the out of service condition and must indicate when it is connected to the busses or lines of the system and is energized to transform power. It must also indicate when it is connected to the bus or lines of the system and has lost energy as a result of some switching operation, which interrupts the energy supply to either the high or low side of the transformer bank.

Assuming that the 13.2 kv. bus is energized by the generator G1, and that the bus disconnect B021, the oil switch B020 and the bank switch B022 are closed while the by-pass switch B027 is open. The relay 703 is energized under this condition over a path which includes contacts B022', B020', and B021'.

As a result of the energization of relay 703, a circuit is completed at armature 731 and its contact for energizing relay 706. This circuit includes positive battery through the contacts 1302—C and 1300—C. The red lamp signal 741 is now energized over a path which extends from positive battery at front contact and armature 726, armature 732 and its contact, and the filament of the lamp signal 741 to negative battery. The symbol on transformer bank 2 now displays a steady red signal to indicate that the bank is connected to bus 1 and is being energized therefrom.

Assuming now that high side switches B222, B—220 and B—223 are closed to connect the energy from the transformer bank 2 to the 33 kv. bus 3. The symbols B222, B220 and B223 will display steady red signals to indicate the closed condition of these switches, and the contacts B223', B220' and B222' will be closed.

Relay 704 is now energized over a circuit which extends from a positive battery at contacts B223', contact B220' and contact B222' and the winding of relay 704 to negative battery. The relay 707 which controls circuits of the lamp signal 737 associated with bus tell-tale 738 is now energized over a path which includes armature 730 and its front contact, front contact and armature 731, and the circuits previously traced for energizing relay 701. The lamp signal 737 is now energized over a path which includes positive battery at front contact and armature 725 to display a steady red signal on the bus symbol 738 to indicate that the bus is energized, or live.

Assuming now that the oil switch 1300 is open and that the symbol displays a green lamp signal as an indication of this condition. The contacts 1300—A, 1300B and 1300—C are open and the energizing circuits of the relays, 701, 702, 706 and 707 are open at these contacts. As a result, the bus tell-tale 740 displays a flashing red signal to indicate that the bus has lost energy. When the relay 706 is deenergized, the energizing circuit of the lamp signal 741 is transferred to the circuits of interrupter 2 at back contact and armature 726, and a flashing red signal is set up on the bank symbol for bank 2 to indicate that the bank is connected to the bus but has lost energy. When the relay 707 is deenergized, the energizing circuit of the lamp signal 737 is transferred to the circuits of interrupter 2 at back contact and armature 725, and a flashing red signal 738 indicates that the 33 kv. bus 3 has lost energy.

Assuming now that the oil switch 1300 is again closed to cause the energization of the bus 1 and the bank 2, and to set up the signals indicative thereof, as previously described, and assuming in this case that the oil switch B220 is opened and the by-pass switch B224 is closed. The relay 705 is now energized over the circuit which includes contacts B224', while the energizing circuit of the relay 704 is opened at contacts B220'. Relay 708 controls the lamp signal 735 which is associated with the bus tell-tale 736, and this relay is now energized over a path which includes armature 728 and its front contact, and armature 731 and the circuits previously described, and energizing relays 701 and 706. At front contact and armature 724, a circuit is completed to energize the lamp signal 735 and to set up a steady red signal on the bus symbol 736 to indicate that bus 4 is energized.

Assuming now that the oil switch B020 and the oil switch B220 are both open and that green lamp signals are set upon the corresponding symbols to indicate this condition, and assume that the by-pass switch B224 is similarly opened and an indication so registered on its symbols. The energizing circuits of relays 703 and 705 are opened at contacts B020' and B222', respectively, and these relays are deenergized. As a result the energizing circuit of the lamp signal 741 is opened at armature 732, at armature 729 and at armature 727. In this case the transformer symbol for bank 2 is dark, which indicates that the bank has been taken out of service.

The circuits in connection with the bank 1 are controlled by relays 501 to 504, inclusive, and are operated in a similar manner to set up the three desirable indications indicative of the condition of the bank 1, by means of the relay circuits and the symbols on the one-line diagram.

Let us assume that the 33 kv. bus 3 is energized and that the switches B113, B110, B111, B012, B010, and B011 are closed, and that the switches B017 and B114 are open. The relays 501 and 502 are energized by circuits completed on contacts of the notching relays, while relay 504 is energized over a path which includes front contact and armature 510, and the circuit previously traced for energizing the relay 707. The lamp signal 599 is energized over a path which includes positive battery at front contact and armature 514 and armature 511 and its front contact. The bank 1 symbol displays a steady red signal as an indication that the bank is energized.

The relay 714 controls the lamp signal 745 associated with the line tell-tale symbol 744 and this relay is now energized over a path which includes armature 508 and its contact, contact and armature 510, and the circuit previously traced for energizing relay 707. The lamp signal 745 is now energized over a circuit which includes positive battery at front contact and armature 716, and the symbol 744 displays a steady red signal to indicate that the line is energized.

From the description already given it will be apparent when the red signal is displayed on the symbol representing the air-break switches 8031 and 8041, that the contacts 8031' and 8041', will be closed. The relay 813 is then energized over a circuit which includes the energizing circuit of the relay 714 and the contacts 8031' and 8041'. The result is that a steady red indication is displayed on the symbol 801 indicative of the live condition of line 1 at that point. The operation of the circuits of the relay 813 in setting up this indication will be obvious from the explanation given in connection with the operation of the circuits of relay 714.

In a similar manner, when the air-break switch 8049 registers the closed condition, the contacts 8049' will be closed and the relay 713 will be energized to set up an indication on the transformer symbol 701 that the transformer is energized, the red lamp 743 associated with the transformer symbol 701 being controlled by armature 715 on relay 713.

From the explanation given in connection with the operation of the various line and bus tell-tales in Fig. 7, the operation of the bus tell-tales 802 and 803 and the line tell-tales 804 and 805 in Fig. 8 will be understood. The relay 815 in Fig. 8, it will be understood, controls the tell-tale lamp signal 812 associated with tell-tale 802. The relay 819 controls the lamp signal 810 associated with tell-tale 803 and these tell-tales are operated in identically the same manner as described in connection with tell-tale indications controlled by the relays 707 and 708. Relay 823 controls lamp signal 825 associated with the line tell-tale 805 and relay 817 controls the lamp signal 807 associated with the line tell-tale 804. These tell-tale indications are operated in identically the same manner as described in connection with indications 744 and 801.

Three indications are desirable in connection with the LaSalle interconnection shown in Fig. 8, which indications are operative as a result of switching done in the following manner: When the oil switch 2000 and the air break switch 2007 are both open, the meter symbol 806 is to be dark, to indicate that the meter is not connected and that the system is not furnishing energy or receiving energy from the interconnections. When the oil switch 2000 registers a green indication of the open condition, the contacts 2010 are open, and when the air-break switch 2007 registers the green lamp indication of the open condition, the contacts 2007—A and 2007—B are open. Under this condition the energizing circuits for the lamp signals 809 and 808 are both open, and the symbol 806 is dark.

Assuming now that the air break switch 2007 is closed, and the contacts 2007—A and 2007—B are closed, as a result of the operation of setting up the closed indications. There is now a circuit completed, which extends from positive battery and armature 822 and its back contact, contacts 2007—B and filament of the lamp signal 808 to negative battery. The amber lamp signal 808 is energized under this condition to indicate on the symbol 806 that the system represented in Figures 7 and 8 is receiving energy over the interconnection, and that the meter on the interconnection at the interconnected company's premises is registering the purchased power. Under this condition it is also seen that the contacts 2007—A are closed, which connect positive battery to the tell-tale circuits in a manner to cause the energization of the relays in these circuits in the same manner as described in connection with the energy connected by generator G1.

Assuming now that the air-break switch 2007 is open and the contacts 2007—A and 2007—B are again open, and that the oil switch 2000 and the air-break switch 2001 are closed, there is now a circuit completed which extends from positive battery from the same source which energizes the relay 815 or 819, as the case may be, contacts of the switching circuit at the bus, contacts 2000' and 2001' and winding of relay 821 to negative battery. With the contact 2007—B open the energizing circuit of the lamp signal 809 is open, and as a result of the energization of the relay 821, a circuit is completed at armature 822 and its front contact to cause the energization of the lamp signal 809. When the lamp signal 809 is energized the meter symbol 806 displays a steady red inciation which serves to tell the operator that the meter is connected to the interconnection and is registering any energy which may be purchased by the interconnected company.

The manner in which the signals on the operator's control board may be operated through the medium of supervisory control equipment has been described in connection with the signal circuits representing the oil switches B010 and B1110. These oil switches control the energy to the transformer bank 1 and its connection to the power system as represented in Figs. 7 and 8.

If we now assume that the entire system is being energized with the switches in their normally closed position from energy received from generator G1, and it will be seen that should the oil switch B110 located in station 01 operate under control of automatic devices to rupture the circuits and its contact, that the supervisory control equipment will be operated to automatically record the fact of this operation by means of the symbol B110, which will display a green lamp indication. At the same time the contacts B110' will be opened resulting in the deenergization of relay 710.

The energy from generator G1 will be disconnected from the balance of the system at armature 720 and its front contacts, with the result that the relays 713 and 714, 813, 815, 817 and 819 will be deenergized, and the tell-tale symbols controlled by these relays will display flashing red signals as an indication of a loss of energy at the points indicated by the location of the tell-tale, thus by reason of the automatically recorded operation of the oil switch B110 to its open position, the dispatch board automatically sets up a number of tell-tale indications indicative of the effect to the system of the operation of the oil switch B110, and it is to be assumed that the entire system may be made wholly operative by a connection to the physical equipment through the medium of supervisory control equipment of various types.

What is claimed is:

1. In a supervisory system for a power distribution system, a chart comprising a one-line diagram in which are included electric symbols representing the various circuits represented by the one-line diagram and also including symbols representing the switching and generating apparatus of the system, manually controlled means for actuating certain of said symbols to cause them to indicate different positions of the switches represented by such symbols, means operated consequent to the actuation of a switch symbol to cause other of said symbols to change and display the changed circuit condition resulting from the actuation of such switch symbol to represent the effect on the system of moving the actual switch, means for then actuating such switch, and means operated consequent to a subsequent change in the position of such switch for causing the symbol representing it to change its display condition to advise the dispatcher that the change represented as a result of the actuation of its symbol has been brought about.

2. In combination with a system of power distribution, a remotely located supervisory system including a one-line diagram containing electrically controlled symbols for indicating the electrical condition of transformers, lines, and buses and for keeping such indications up-to-date with any changes which occur due to switching operations occurring on the power distribution system, symbols representing switching apparatus, dispatcher controlled means for selecting and setting said last symbols to indicate different switch positions, means operative consequent to such setting for modifying the displayed condition of other of the symbols to advise the operator of the changes which will occur in the system if the change is actually made, means made available by such setting for causing the power apparatus to change and bring about the condition of the system as represented by the symbols, and means operated consequent to the change being actually made for so advising the dispatcher.

3. In combination with a system of power distribution; a combined supervisory and remote control system, a display board in said system comprising a one-line diagram including symbols representing the interconnections and operable equipment of the system of power distribution, means for setting the symbols in a manner representing a proposed changed condition of the power distribution system, means for then and then only bringing about such change, and means operated consequent to such change for causing said display board to fully register such change.

4. In combination with a system of power distribution, a remote control system and an interconnected supervisory system, means in said supervisory system for indicating the actual position of the switches of the power distribution system, operator controlled means for setting up and indicating a proposed change in position of switches of the power system on said supervisory equipment, operator control means for then causing the actual equipment to change its position to that proposed, and means for preventing an actual change being brought about by said last operator controlled means while the supervisory system indications harmonize with the actual switch positions.

5. In combination with a supervisory system for a system of electric power distribution, a pilot board having symbols interconnected with a one-line diagram representing the apparatus and circuits of the system of electric power distribution, means for actuating certain of said symbols to cause them to display one of a plurality of conditions, other means operative consequent to and in a manner dependent on the symbol actuated and its changed condition for changing the condition of miscellaneous other symbols representing circuits and equipment effected by the change in condition of the equipment represented by the first actuated symbol, and means under control of the supervisory system for automatically selecting and operating any symbol responsive to a change in the condition of apparatus represented by it to cause the pilot board to display signals representing the actual changed condition of the power system.

6. In a supervisory system for the control of remotely disposed switches, a display board containing symbols representing such switches, means for causing the symbols to indicate switch positions corresponding to the positions of the represented switches and for alternatively causing said symbols to display switch position indications at variance with the actual positions of their switches, signalling means operated to advise a dispatcher when a position indication is at variance with the position of the represented switch, dispatcher-controlled means for operating the switch at the remote point only when the switch position indication is at variance with the actual position of the switch, signalling means again operated consequent to the operation of said switch to advise the dispatcher that the switch and symbol positions are in agreement.

7. In a supervisory system for a system of power distribution, a display board containing a plurality of symbols representing switches of the system, a plurality of auxiliary switches, there being one individual to each switch symbol, a plurality of other symbols associated with the lines constituting a one-line diagram interconnecting the first-mentioned symbols and representing the interconnections of the system, dispatcher-controlled means for operating various ones of said auxiliary switches to display various switch position indications upon their symbols, control circuits for the second-mentioned symbols operated in a manner dependent on the setting of the auxiliary switches to indicate the effect on the system should the actual switches thereof be so set, and control circuits for the actual switches prepared by their represented auxiliary switches consequent to the setting of the proposed change in their position.

8. In a supervisory system for a system of power distribution, a display board containing diagrams and symbols representing the circuits and apparatus of the system, circuits and apparatus indicating by means of said symbols and diagrams the electrified or non-electrified condition of the represented circuits and apparatus of the system, means controlled by a dispatcher for setting up a display condition representing a desired modified circuit condition of the actual system, control circuits for the actual apparatus prepared consequent to the setting of the display in accordance with the proposed change, dispatcher's means for then bringing about the proposed change on the actual apparatus, and circuits and apparatus under direct control of the apparatus of the power system for causing the display condition of said symbols to change to the full extent necessary to indicate to the dispatcher that the proposed change has actually been brought about.

9. The combination with a system of power distribution, a display board containing symbols representing the switches of said system, a one-line diagram interconnecting said symbols and representing interconnections of said system, symbols included in said diagram for indicating the energized or deenergized condition thereof, in accordance with the indicating condition of the first symbols, dispatcher-controlled switching means for setting the symbols of the first group to indicate any desired switch position, contacts on said switching means for controlling the display condition of said second-mentioned symbols in accordance with the operation of the switching means to modify the display condition of certain ones of said second-mentioned symbols, and other contacts on said switching means closed by the operation thereof to prepare control circuits for the actual represented switching devices of the system.

10. In a control system wherein a supervisory display board includes a one-line diagram connecting symbols indicative of circuit breakers and disconnect and by-pass switches in actual use in a power supply system in the field at a remote point, means controlled by a dispatcher in case he desires to make some power change in the field for selectively operating the symbols in the one-line diagram to their positions corresponding to a proposed change in the field, additional symbols representing bus bars and transformers automatically responsive thereto for visually indicating on the one-line diagram the results of such proposed change, means operated responsive to said selective operation for also preparing a plurality of operating circuits for the circuit breakers in the field included in the proposed change, and dispatcher-controlled means for operating the selected circuit breakers over the prepared circuits.

11. In a supervisory system, a plurality of switches located at a remote point and a display board containing a plurality of symbols representing said switches, means operated by the dispatcher to display said symbols to indicate switch position indications at variance with the positions of the represented switches, and switch control means prepared for operation thereby to enable the dispatcher by the operation of said first means to operate said switches to positions agreeing with those displayed by their symbols.

12. In combination with a system of power distribution, a remotely disposed supervisory board containing a one-line diagram with symbols representing the equipment of the power apparatus of the system, dispatcher-controlled means for setting up displays on the supervisory board to indicate the effect of a proposed change to the system, operator-controlled means for then changing the apparatus of the system in accordance with that proposed, means on said display board operated consequent to such change to notify the operator that the apparatus of the system has been changed in the manner proposed, and means for preventing the dispatcher from making any changes in the circuits of the actual system until after such change has been set up on the supervisory board.

13. In combination with a group of interconnected switches, a display board containing symbols and a one-line diagram representing said group of switches and their interconnections, dispatcher-controlled means for causing said display board to display a circuit representation in harmony with the circuit conditions actually existing and for also changing the display board in accordance with a proposed change of the system, disagreement signals on the display board displayed consequent to the display of indications of switch positions not in harmony with the actual positions of the represented switches of the system to so notify the dispatcher, dispatcher-controlled means for then operating the actual switches of the system, and means controlled by the movement of said switches for retiring said disagreement signals.

14. In a supervisory system, a display board containing a symbol representing a remotely located switching mechanism, an electromagnetic circuit switching device operated at the will of a dispatcher to change the display condition of said symbol, a control circuit for the switch prepared by the contacts on said switching mechanism, dispatcher-controlled means for completing said circuit to move the represented switch to another position, and contacts on the switch operated consequent to its movement to also modify the display condition of said symbol.

15. In a supervisory system for a system of power distribution, a display panel having a one-line diagram with interconnected symbols, the whole representing the circuits and apparatus of the aforesaid system, dispatcher-controlled means for setting the symbols into a display condition harmonizing with the condition of the actual apparatus of said system, other symbols operated in accordance with the setting of the dispatcher-controlled symbols to indicate the electrical or non-electrical condition of the interconnections and other apparatus represented, a third set of symbols on said board operated consequent to the change in position of any apparatus of the actual system to notify the dispatcher of such change, and contacts controlled by the dispatcher for also actuating symbols of said third set to indicate a proposed change of the actual apparatus.

16. In a supervisory system including a system of power distribution, a display panel containing symbols representing the switching apparatus of the aforesaid system, dispatcher-controlled means for placing said symbols in a non-display condition while the switches represented by them are in a closed position, means controlled by the movement of a represented switch into its open position to cause its symbol to assume a display condition corresponding to its new position, a second symbol, and means operated consequent to the movement of said switch to its open position to notify the dispatcher that the setting of the associated switch no longer agrees with the said setting of the dispatcher-controlled means.

17. In a combined supervisory and remote control system, for a system of power distribution, a symbol equipped one-line diagram representing the network and equipment of a system of power distribution, said equipment comprising switches having closed and open positions and a blocked or hold condition means for causing said symbols and diagram to represent the actual position as well as a hold condition of the switches and network of the power system, operator-controlled means for controlling the display condition of said one-line diagram to indicate a condition disagreeing with the condition of the actual equipment; operator-controlled means for then, through the medium of said remote control means, causing a switch of the system of power distribution to be actuated, means controlled by the actuation of such switch for wiping out the disagreement indication, and means for preventing the operator changing a switch position in case the represented switch is being held in a "blocking" or hold condition.

18. In a combined supervisory and remote control system for a remote power distribution system, a dispatchers' position, a display panel at the dispatcher's position carrying a mimic power system representing the circuits and apparatus of the remote system, means controlled by the dispatcher for selecting and changing the position of apparatus on the mimic system, means responsive to the operation of such apparatus of the mimic system for indicating the live or dead condition of the mimic system as influenced by the changed apparatus, signalling means on the panel for indicating disagreements between the apparatus of the mimic system and that of the remote system, and means controlled by the dispatcher through apparatus on the panel for changing the position of apparatus of the remote system to agree with that of apparatus of the mimic system.

THOMAS U. WHITE.